United States Patent
Boynton et al.

(10) Patent No.: US 8,549,587 B2
(45) Date of Patent: *Oct. 1, 2013

(54) SECURE END-TO-END TRANSPORT THROUGH INTERMEDIARY NODES

(75) Inventors: Lee R. Boynton, Lake Oswego, OR (US); Trevor A. Fiatal, Fremont, CA (US); Scott M. Burke, Mountain View, CA (US); Mark Sikes, Ben Lamond, CA (US)

(73) Assignee: Seven Networks, Inc., Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/396,464

(22) Filed: Feb. 14, 2012

(65) Prior Publication Data

US 2012/0210121 A1  Aug. 16, 2012

Related U.S. Application Data

(63) Continuation of application No. 12/889,252, filed on Sep. 23, 2010, now Pat. No. 8,127,342, which is a continuation of application No. 11/875,785, filed on Oct. 19, 2007, now Pat. No. 7,827,597, which is a continuation of application No. 10/339,369, filed on Jan. 8, 2003, now Pat. No. 7,305,700.

(60) Provisional application No. 60/346,881, filed on Jan. 8, 2002, provisional application No. 60/403,249, filed on Aug. 12, 2002.

(51) Int. Cl.
*H04L 29/00* (2006.01)

(52) U.S. Cl.
USPC .................................. 726/4; 380/270

(58) Field of Classification Search
USPC ....................... 713/150; 726/4; 380/270
See application file for complete search history.

(56) References Cited

U.S. PATENT DOCUMENTS

| | | |
|---|---|---|
| 222,458 A | 12/1879 | Connolly et al. |
| 447,918 A | 3/1891 | Strowger |
| 4,200,770 A | 4/1980 | Hellman et al. |
| 4,255,796 A | 3/1981 | Gabbe et al. |
| 4,276,597 A | 6/1981 | Dissly et al. |
| 4,531,020 A | 7/1985 | Wechselberger et al. |
| 4,807,182 A | 2/1989 | Queen |

(Continued)

FOREIGN PATENT DOCUMENTS

| | | |
|---|---|---|
| EP | 0772327 A2 | 5/1997 |
| EP | 1278390 A1 | 1/2003 |

(Continued)

OTHER PUBLICATIONS

Allchin, James Edward, "An Architecture for Reliable Decentralized Systems," Ph.D. Thesis, Georgia Institute of Technology, 185 pages, Sep. 1983.

(Continued)

*Primary Examiner* — Matthew Smithers
(74) *Attorney, Agent, or Firm* — Perkins Coie LLP

(57) ABSTRACT

A communication network encrypts a first portion of a transaction associated with point-to-point communications using a point-to-point encryption key. A second portion of the transaction associated with end-to-end communications is encrypted using an end-to-end encryption key.

27 Claims, 7 Drawing Sheets

(56) References Cited

U.S. PATENT DOCUMENTS

| | | | |
|---|---|---|---|
| 4,831,582 | A | 5/1989 | Miller et al. |
| 4,875,159 | A | 10/1989 | Cary et al. |
| 4,897,781 | A | 1/1990 | Chang et al. |
| 4,972,457 | A | 11/1990 | O'Sullivan |
| 5,008,853 | A | 4/1991 | Bly et al. |
| 5,159,624 | A | 10/1992 | Makita |
| 5,220,657 | A | 6/1993 | Bly et al. |
| 5,263,157 | A | 11/1993 | Janis |
| 5,283,856 | A | 2/1994 | Gross et al. |
| 5,357,431 | A | 10/1994 | Nakada et al. |
| 5,384,892 | A | 1/1995 | Strong |
| 5,386,564 | A | 1/1995 | Shearer et al. |
| 5,392,390 | A | 2/1995 | Crozier |
| 5,434,994 | A | 7/1995 | Shaheen et al. |
| 5,436,960 | A | 7/1995 | Campana, Jr. et al. |
| 5,438,611 | A | 8/1995 | Campana, Jr. et al. |
| 5,479,472 | A | 12/1995 | Campana, Jr. et al. |
| 5,487,100 | A | 1/1996 | Kane |
| 5,491,703 | A | 2/1996 | Barnaby et al. |
| 5,493,692 | A | 2/1996 | Theimer et al. |
| 5,519,606 | A | 5/1996 | Frid-Nielsen et al. |
| 5,555,376 | A | 9/1996 | Theimer et al. |
| 5,559,800 | A | 9/1996 | Mousseau et al. |
| 5,572,571 | A | 11/1996 | Shirai |
| 5,572,643 | A | 11/1996 | Judson |
| 5,574,859 | A | 11/1996 | Yeh |
| 5,581,749 | A | 12/1996 | Hossain et al. |
| 5,600,834 | A | 2/1997 | Howard |
| 5,603,054 | A | 2/1997 | Theimer et al. |
| 5,604,788 | A | 2/1997 | Tett |
| 5,613,012 | A | 3/1997 | Hoffman et al. |
| 5,619,507 | A | 4/1997 | Tsuda |
| 5,619,648 | A | 4/1997 | Canale et al. |
| 5,623,601 | A | 4/1997 | Vu |
| 5,625,670 | A | 4/1997 | Campana, Jr. et al. |
| 5,625,815 | A | 4/1997 | Maier et al. |
| 5,627,658 | A | 5/1997 | Connors et al. |
| 5,630,081 | A | 5/1997 | Rybicki et al. |
| 5,631,946 | A | 5/1997 | Campana, Jr. et al. |
| 5,632,018 | A | 5/1997 | Otorii |
| 5,634,053 | A | 5/1997 | Noble et al. |
| 5,647,002 | A | 7/1997 | Brunson |
| 5,652,884 | A | 7/1997 | Palevich |
| 5,664,207 | A | 9/1997 | Crumpler et al. |
| 5,666,530 | A | 9/1997 | Clark et al. |
| 5,666,553 | A | 9/1997 | Crozier |
| 5,680,542 | A | 10/1997 | Mulchandani et al. |
| 5,682,524 | A | 10/1997 | Freund et al. |
| 5,684,990 | A | 11/1997 | Boothby |
| 5,689,654 | A | 11/1997 | Kikinis et al. |
| 5,692,039 | A | 11/1997 | Brankley et al. |
| 5,696,903 | A | 12/1997 | Mahany |
| 5,701,423 | A | 12/1997 | Crozier |
| 5,701,469 | A | 12/1997 | Brandli et al. |
| 5,704,029 | A | 12/1997 | Wright, Jr. |
| 5,706,211 | A | 1/1998 | Beletic et al. |
| 5,706,502 | A | 1/1998 | Foley et al. |
| 5,706,507 | A | 1/1998 | Schloss |
| 5,710,918 | A | 1/1998 | Lagarde et al. |
| 5,713,019 | A | 1/1998 | Keaten |
| 5,715,403 | A | 2/1998 | Stefik |
| 5,717,925 | A | 2/1998 | Harper et al. |
| 5,721,908 | A | 2/1998 | Lagarde et al. |
| 5,721,914 | A | 2/1998 | DeVries |
| 5,727,202 | A | 3/1998 | Kucala |
| 5,729,549 | A | 3/1998 | Kostreski et al. |
| 5,729,704 | A | 3/1998 | Stone et al. |
| 5,729,735 | A | 3/1998 | Meyering |
| 5,742,905 | A | 4/1998 | Pepe et al. |
| 5,745,360 | A | 4/1998 | Leone et al. |
| 5,752,186 | A | 5/1998 | Malackowski et al. |
| 5,752,246 | A | 5/1998 | Rogers et al. |
| 5,754,938 | A | 5/1998 | Herz et al. |
| 5,757,916 | A | 5/1998 | MacDoran et al. |
| 5,758,088 | A | 5/1998 | Bezaire et al. |
| 5,758,150 | A | 5/1998 | Bell et al. |
| 5,758,322 | A | 5/1998 | Rongley |
| 5,758,354 | A | 5/1998 | Huang et al. |
| 5,758,355 | A | 5/1998 | Buchanan |
| 5,765,171 | A | 6/1998 | Gehani et al. |
| 5,778,346 | A | 7/1998 | Frid-Nielsen et al. |
| 5,778,361 | A | 7/1998 | Nanjo et al. |
| 5,781,614 | A | 7/1998 | Brunson |
| 5,781,901 | A | 7/1998 | Kuzma |
| 5,781,906 | A | 7/1998 | Aggarwal et al. |
| 5,787,430 | A | 7/1998 | Doeringer et al. |
| 5,787,441 | A | 7/1998 | Beckhardt |
| 5,790,425 | A | 8/1998 | Wagle |
| 5,790,790 | A | 8/1998 | Smith et al. |
| 5,790,974 | A | 8/1998 | Tognazzini |
| 5,793,413 | A | 8/1998 | Hylton et al. |
| 5,794,210 | A | 8/1998 | Goldhaber et al. |
| 5,799,318 | A | 8/1998 | Cardinal et al. |
| 5,802,312 | A | 9/1998 | Lazaridis et al. |
| 5,802,454 | A | 9/1998 | Goshay et al. |
| 5,802,518 | A | 9/1998 | Karaev et al. |
| 5,802,524 | A | 9/1998 | Flowers et al. |
| 5,806,074 | A | 9/1998 | Souder et al. |
| 5,809,242 | A | 9/1998 | Shaw et al. |
| 5,809,415 | A | 9/1998 | Rossmann |
| 5,818,437 | A | 10/1998 | Grover et al. |
| 5,819,172 | A | 10/1998 | Campana, Jr. et al. |
| 5,819,274 | A | 10/1998 | Jackson, Jr. |
| 5,819,284 | A | 10/1998 | Farber et al. |
| 5,822,324 | A | 10/1998 | Kostresti et al. |
| 5,822,747 | A | 10/1998 | Graefe et al. |
| 5,826,269 | A | 10/1998 | Hussey |
| 5,831,664 | A | 11/1998 | Wharton et al. |
| 5,832,483 | A | 11/1998 | Barker |
| 5,832,489 | A | 11/1998 | Kucala |
| 5,832,500 | A | 11/1998 | Burrows |
| 5,835,087 | A | 11/1998 | Herz et al. |
| 5,835,722 | A | 11/1998 | Bradshaw et al. |
| 5,838,252 | A | 11/1998 | Kikinis |
| 5,838,768 | A | 11/1998 | Sumar et al. |
| 5,838,973 | A | 11/1998 | Carpenter-Smith et al. |
| 5,845,278 | A | 12/1998 | Kirsch et al. |
| 5,852,775 | A | 12/1998 | Hidary |
| 5,852,820 | A | 12/1998 | Burrows |
| 5,857,201 | A | 1/1999 | Wright, Jr. et al. |
| 5,862,223 | A | 1/1999 | Walker et al. |
| 5,867,665 | A | 2/1999 | Butman et al. |
| 5,867,817 | A | 2/1999 | Catallo et al. |
| 5,870,759 | A | 2/1999 | Bauer et al. |
| 5,884,323 | A | 3/1999 | Hawkins et al. |
| 5,889,845 | A | 3/1999 | Staples et al. |
| 5,890,147 | A | 3/1999 | Peltonen et al. |
| 5,892,909 | A | 4/1999 | Grasso et al. |
| 5,898,780 | A | 4/1999 | Liu et al. |
| 5,898,917 | A | 4/1999 | Batni et al. |
| 5,903,723 | A | 5/1999 | Beck et al. |
| 5,907,618 | A | 5/1999 | Gennaro et al. |
| 5,909,689 | A | 6/1999 | Van Ryzin |
| 5,913,032 | A | 6/1999 | Schwartz et al. |
| 5,924,096 | A | 7/1999 | Draper et al. |
| 5,928,325 | A | 7/1999 | Shaughnessy et al. |
| 5,928,329 | A | 7/1999 | Clark et al. |
| 5,937,161 | A | 8/1999 | Mulligan et al. |
| 5,940,813 | A | 8/1999 | Hutchings |
| 5,943,676 | A | 8/1999 | Boothby |
| 5,948,066 | A | 9/1999 | Whalen et al. |
| 5,951,636 | A | 9/1999 | Zerber |
| 5,960,394 | A | 9/1999 | Gould et al. |
| 5,960,406 | A | 9/1999 | Rasansky et al. |
| 5,961,590 | A | 10/1999 | Mendez et al. |
| 5,963,642 | A | 10/1999 | Goldstein |
| 5,964,833 | A | 10/1999 | Kikinis |
| 5,968,131 | A | 10/1999 | Mendez et al. |
| 5,974,238 | A | 10/1999 | Chase, Jr. |
| 5,974,327 | A | 10/1999 | Agrawal et al. |
| 5,978,837 | A | 11/1999 | Foladare et al. |
| 5,978,933 | A | 11/1999 | Wyld et al. |
| 5,987,440 | A | 11/1999 | O'Neil et al. |
| 6,000,000 | A | 12/1999 | Hawkins et al. |

| | | | | | | |
|---|---|---|---|---|---|---|
| 6,003,070 | A | 12/1999 | Frantz | 6,292,904 | B1 | 9/2001 | Broomhall et al. |
| 6,006,274 | A | 12/1999 | Hawkins et al. | 6,295,541 | B1 | 9/2001 | Bodnar et al. |
| 6,016,478 | A | 1/2000 | Zhang et al. | 6,300,947 | B1 | 10/2001 | Kanevsky |
| 6,016,520 | A | 1/2000 | Facq et al. | 6,304,881 | B1 | 10/2001 | Halim et al. |
| 6,018,762 | A | 1/2000 | Brunson et al. | 6,308,201 | B1 | 10/2001 | Pivowar et al. |
| 6,023,700 | A | 2/2000 | Owens et al. | 6,317,594 | B1 | 11/2001 | Gossman et al. |
| 6,023,708 | A | 2/2000 | Mendez et al. | 6,320,943 | B1 | 11/2001 | Borland |
| 6,029,238 | A | 2/2000 | Furukawa | 6,324,541 | B1 | 11/2001 | de l'Etraz et al. |
| 6,034,621 | A | 3/2000 | Kaufman | 6,324,542 | B1 | 11/2001 | Wright, Jr. et al. |
| 6,035,104 | A | 3/2000 | Zahariev | 6,324,544 | B1 | 11/2001 | Alam et al. |
| 6,044,372 | A | 3/2000 | Rothfus et al. | 6,324,587 | B1 | 11/2001 | Trenbeath et al. |
| 6,044,381 | A | 3/2000 | Boothby et al. | 6,327,586 | B1 | 12/2001 | Kisiel |
| 6,047,051 | A | 4/2000 | Ginzboorg et al. | 6,336,117 | B1 | 1/2002 | Massarani |
| 6,047,327 | A | 4/2000 | Tso et al. | 6,336,138 | B1 | 1/2002 | Caswell et al. |
| 6,052,563 | A | 4/2000 | Macko | 6,351,767 | B1 | 2/2002 | Batchelder et al. |
| 6,052,735 | A | 4/2000 | Ulrich et al. | 6,356,937 | B1 | 3/2002 | Montville et al. |
| 6,057,855 | A | 5/2000 | Barkans | 6,363,051 | B1 | 3/2002 | Eslambolchi et al. |
| 6,065,055 | A | 5/2000 | Hughes et al. | 6,363,352 | B1 | 3/2002 | Dailey et al. |
| 6,073,138 | A | 6/2000 | de l'Etraz et al. | 6,370,566 | B2 | 4/2002 | Discolo et al. |
| 6,073,142 | A | 6/2000 | Geiger et al. | 6,377,810 | B1 | 4/2002 | Geiger et al. |
| 6,073,165 | A | 6/2000 | Narasimhan et al. | 6,380,959 | B1 | 4/2002 | Wang et al. |
| 6,085,166 | A | 7/2000 | Beckhardt et al. | 6,389,422 | B1 | 5/2002 | Doi et al. |
| 6,085,192 | A | 7/2000 | Mendez et al. | 6,389,455 | B1 | 5/2002 | Fuisz |
| 6,088,677 | A | 7/2000 | Spurgeon | 6,389,457 | B2 | 5/2002 | Lazaridis et al. |
| 6,101,320 | A | 8/2000 | Schuetze et al. | 6,397,057 | B1 | 5/2002 | Malackowski et al. |
| 6,101,480 | A | 8/2000 | Conmy et al. | 6,397,230 | B1 | 5/2002 | Carmel et al. |
| 6,101,531 | A | 8/2000 | Eggleston et al. | 6,401,104 | B1 | 6/2002 | LaRue et al. |
| 6,112,181 | A | 8/2000 | Shear et al. | 6,401,112 | B1 | 6/2002 | Boyer et al. |
| 6,119,014 | A | 9/2000 | Alperovich et al. | 6,401,113 | B2 | 6/2002 | Lazaridis et al. |
| 6,119,171 | A | 9/2000 | Alkhatib | 6,405,197 | B2 | 6/2002 | Gilmour |
| 6,125,369 | A | 9/2000 | Wu et al. | 6,411,696 | B1 | 6/2002 | Iverson et al. |
| 6,125,388 | A | 9/2000 | Reisman | 6,415,031 | B1 | 7/2002 | Colligan et al. |
| 6,128,627 | A | 10/2000 | Mattis et al. | 6,418,308 | B1 | 7/2002 | Heinonen et al. |
| 6,130,898 | A | 10/2000 | Kostreski et al. | 6,421,669 | B1 | 7/2002 | Gilmour et al. |
| 6,131,096 | A | 10/2000 | Ng et al. | 6,421,781 | B1 | 7/2002 | Fox et al. |
| 6,131,116 | A | 10/2000 | Riggins et al. | 6,430,602 | B1 | 8/2002 | Kay et al. |
| 6,134,432 | A | 10/2000 | Holmes et al. | 6,438,585 | B2 | 8/2002 | Mousseau et al. |
| 6,138,013 | A | 10/2000 | Blanchard et al. | 6,438,612 | B1 | 8/2002 | Ylonen et al. |
| 6,138,124 | A | 10/2000 | Beckhardt | 6,442,589 | B1 | 8/2002 | Takahashi et al. |
| 6,138,128 | A | 10/2000 | Perkowitz et al. | 6,442,637 | B1 | 8/2002 | Hawkins et al. |
| 6,138,146 | A | 10/2000 | Moon et al. | 6,446,118 | B1 | 9/2002 | Gottlieb |
| 6,141,664 | A | 10/2000 | Boothby | 6,463,463 | B1 | 10/2002 | Godfrey et al. |
| 6,151,606 | A | 11/2000 | Mendez | 6,463,464 | B1 | 10/2002 | Lazaridis et al. |
| 6,157,630 | A | 12/2000 | Adler et al. | 6,487,557 | B1 | 11/2002 | Nagatomo |
| 6,161,140 | A | 12/2000 | Moriya | 6,487,560 | B1 | 11/2002 | LaRue et al. |
| 6,167,379 | A | 12/2000 | Dean et al. | 6,490,353 | B1 | 12/2002 | Tan |
| 6,167,435 | A | 12/2000 | Druckenmiller et al. | 6,496,802 | B1 | 12/2002 | van Zoest et al. |
| 6,170,014 | B1 | 1/2001 | Darago et al. | 6,499,054 | B1 | 12/2002 | Hesselink et al. |
| 6,173,312 | B1 | 1/2001 | Atarashi et al. | 6,505,214 | B1 | 1/2003 | Sherman et al. |
| 6,173,446 | B1 | 1/2001 | Khan et al. | 6,516,327 | B1 | 2/2003 | Zondervan et al. |
| 6,175,831 | B1 | 1/2001 | Weinreich et al. | 6,526,433 | B1 | 2/2003 | Chang et al. |
| 6,178,419 | B1 | 1/2001 | Legh-Smith et al. | 6,526,506 | B1 | 2/2003 | Lewis |
| 6,181,935 | B1 | 1/2001 | Gossman et al. | 6,529,908 | B1 | 3/2003 | Piett et al. |
| 6,185,184 | B1 | 2/2001 | Mattaway et al. | 6,532,446 | B1 | 3/2003 | King |
| 6,195,533 | B1 | 2/2001 | Tkatch et al. | 6,535,892 | B1 | 3/2003 | LaRue et al. |
| 6,198,696 | B1 | 3/2001 | Korpi et al. | 6,546,005 | B1 | 4/2003 | Berkley et al. |
| 6,198,922 | B1 | 3/2001 | Baynham | 6,549,939 | B1 | 4/2003 | Ford et al. |
| 6,201,469 | B1 | 3/2001 | Balch et al. | 6,556,217 | B1 | 4/2003 | Mäkipää et al. |
| 6,202,085 | B1 | 3/2001 | Benson et al. | 6,593,944 | B1 | 7/2003 | Nicolas et al. |
| 6,205,448 | B1 | 3/2001 | Kruglikov et al. | 6,601,026 | B2 | 7/2003 | Appelt et al. |
| 6,212,529 | B1 | 4/2001 | Boothby et al. | 6,615,253 | B1 | 9/2003 | Bowman-Amuah |
| 6,219,694 | B1 | 4/2001 | Lazaridis et al. | 6,618,710 | B1 | 9/2003 | Zondervan et al. |
| 6,221,877 | B1 | 4/2001 | Aronov et al. | 6,621,892 | B1 | 9/2003 | Banister et al. |
| 6,223,187 | B1 | 4/2001 | Boothby et al. | 6,625,621 | B2 | 9/2003 | Tan et al. |
| 6,226,686 | B1 | 5/2001 | Rothschild et al. | 6,636,482 | B2 | 10/2003 | Cloonan et al. |
| 6,233,341 | B1 | 5/2001 | Riggins | 6,639,693 | B1 | 10/2003 | Ejiri et al. |
| 6,243,705 | B1 | 6/2001 | Kucala | 6,640,097 | B2 | 10/2003 | Corrigan et al. |
| 6,246,875 | B1 | 6/2001 | Seazholtz et al. | 6,640,244 | B1 | 10/2003 | Bowman-Amuah |
| 6,247,135 | B1 | 6/2001 | Feague | 6,640,249 | B1 | 10/2003 | Bowman-Amuah |
| 6,249,808 | B1 | 6/2001 | Seshadri | 6,643,650 | B1 | 11/2003 | Slaughter et al. |
| 6,256,666 | B1 | 7/2001 | Singhal | 6,643,688 | B1 | 11/2003 | Fuisz |
| 6,263,201 | B1 | 7/2001 | Hashimoto et al. | 6,647,384 | B2 | 11/2003 | Gilmour |
| 6,263,340 | B1 | 7/2001 | Green | 6,650,890 | B1 | 11/2003 | Irlam et al. |
| 6,269,369 | B1 | 7/2001 | Robertson | 6,662,016 | B1 | 12/2003 | Buckham et al. |
| 6,272,545 | B1 | 8/2001 | Flanagin et al. | 6,668,046 | B1 | 12/2003 | Albal |
| 6,275,850 | B1 | 8/2001 | Beyda et al. | 6,671,695 | B2 | 12/2003 | McFadden |
| 6,275,858 | B1 | 8/2001 | Bates et al. | 6,671,700 | B1 | 12/2003 | Creemer et al. |
| 6,289,212 | B1 | 9/2001 | Stein et al. | 6,671,702 | B2 | 12/2003 | Kruglikov et al. |
| 6,289,214 | B1 | 9/2001 | Backstrom | 6,671,757 | B1 | 12/2003 | Multer et al. |

| Patent | Kind | Date | Inventor |
|---|---|---|---|
| 6,694,336 | B1 | 2/2004 | Multer et al. |
| 6,697,807 | B2 | 2/2004 | McGeachie |
| 6,701,378 | B1 | 3/2004 | Gilhuly et al. |
| 6,707,801 | B2 | 3/2004 | Hsu |
| 6,708,221 | B1 | 3/2004 | Mendez et al. |
| 6,714,965 | B2 | 3/2004 | Kakuta et al. |
| 6,721,787 | B1 | 4/2004 | Hiscock |
| 6,727,917 | B1 | 4/2004 | Chew et al. |
| 6,728,530 | B1 | 4/2004 | Heinonen et al. |
| 6,728,786 | B2 | 4/2004 | Hawkins et al. |
| 6,732,101 | B1 | 5/2004 | Cook |
| 6,732,158 | B1 | 5/2004 | Hesselink et al. |
| 6,735,591 | B2 | 5/2004 | Khan |
| 6,741,232 | B1 | 5/2004 | Siedlikowski et al. |
| 6,741,855 | B1 | 5/2004 | Martin et al. |
| 6,742,015 | B1 | 5/2004 | Bowman-Amuah |
| 6,742,059 | B1 | 5/2004 | Todd et al. |
| 6,745,024 | B1 | 6/2004 | DeJaco et al. |
| 6,745,326 | B1 | 6/2004 | Wary |
| 6,756,882 | B2 | 6/2004 | Benes et al. |
| 6,757,362 | B1 | 6/2004 | Cooper et al. |
| 6,757,696 | B2 | 6/2004 | Multer et al. |
| 6,757,708 | B1 | 6/2004 | Craig et al. |
| 6,760,916 | B2 | 7/2004 | Holtz et al. |
| 6,771,294 | B1 | 8/2004 | Pulli et al. |
| 6,775,362 | B1 | 8/2004 | Ransom |
| 6,779,019 | B1 | 8/2004 | Mousseau et al. |
| 6,782,409 | B1 | 8/2004 | Yoshida |
| 6,785,868 | B1 | 8/2004 | Raff |
| 6,785,906 | B1 | 8/2004 | Gaughan et al. |
| 6,799,190 | B1 | 9/2004 | Boothby |
| 6,804,707 | B1 | 10/2004 | Ronning |
| 6,816,849 | B1 | 11/2004 | Halt, Jr. |
| 6,820,088 | B1 | 11/2004 | Hind et al. |
| 6,820,204 | B1 | 11/2004 | Desai et al. |
| 6,829,487 | B2 | 12/2004 | Eiden et al. |
| 6,834,195 | B2 | 12/2004 | Brandenberg et al. |
| 6,847,974 | B2 | 1/2005 | Wachtel |
| 6,850,757 | B2 | 2/2005 | Watanabe et al. |
| 6,859,212 | B2 | 2/2005 | Kumar et al. |
| 6,867,774 | B1 | 3/2005 | Halmshaw et al. |
| 6,868,447 | B1 | 3/2005 | Slaughter et al. |
| 6,871,220 | B1 | 3/2005 | Rajan et al. |
| 6,871,236 | B2 | 3/2005 | Fishman et al. |
| 6,873,688 | B1 | 3/2005 | Aarnio |
| 6,874,017 | B1 | 3/2005 | Inoue et al. |
| 6,879,985 | B2 | 4/2005 | Deguchi et al. |
| 6,886,030 | B1 | 4/2005 | Easterbrook et al. |
| 6,892,070 | B2 | 5/2005 | Warrier et al. |
| 6,892,196 | B1 | 5/2005 | Hughes |
| 6,895,394 | B1 | 5/2005 | Kremer et al. |
| 6,895,558 | B1 | 5/2005 | Loveland |
| 6,898,427 | B1 | 5/2005 | Griffith et al. |
| 6,922,547 | B2 | 7/2005 | O'Neill et al. |
| 6,922,721 | B1 | 7/2005 | Minborg et al. |
| 6,925,477 | B1 | 8/2005 | Champagne et al. |
| 6,931,529 | B2 | 8/2005 | Kunzinger |
| 6,938,079 | B1 | 8/2005 | Anderson et al. |
| 6,944,447 | B2 | 9/2005 | Portman et al. |
| 6,944,662 | B2 | 9/2005 | Devine et al. |
| 6,947,770 | B2 | 9/2005 | Rydbeck |
| 6,957,397 | B1 | 10/2005 | Hawkins et al. |
| 6,965,917 | B1 | 11/2005 | Aloni et al. |
| 6,966,058 | B2 | 11/2005 | Earl et al. |
| 6,968,175 | B2 | 11/2005 | Raivisto et al. |
| 6,970,879 | B1 | 11/2005 | Gilmour |
| 6,972,682 | B2 | 12/2005 | Lareau et al. |
| 6,973,299 | B2 | 12/2005 | Apfel |
| 6,981,041 | B2 | 12/2005 | Araujo et al. |
| 6,981,047 | B2 | 12/2005 | Hanson et al. |
| 6,985,933 | B1 | 1/2006 | Singhal et al. |
| 6,985,983 | B2 | 1/2006 | Pellegrino et al. |
| 6,986,061 | B1 | 1/2006 | Kunzinger |
| 6,987,734 | B2 | 1/2006 | Hundemer |
| 6,990,472 | B2 | 1/2006 | Rosenhaft et al. |
| 6,993,326 | B2 | 1/2006 | Link, II et al. |
| 6,993,327 | B2 | 1/2006 | Mathis |
| 6,996,627 | B1 | 2/2006 | Carden |
| 6,999,753 | B2 | 2/2006 | Beckmann et al. |
| 7,020,685 | B1 | 3/2006 | Chen et al. |
| 7,024,491 | B1 | 4/2006 | Hanmann et al. |
| 7,026,984 | B1 | 4/2006 | Thandu et al. |
| 7,032,242 | B1 | 4/2006 | Grabelsky et al. |
| 7,035,630 | B2 | 4/2006 | Knowles |
| 7,046,993 | B2 | 5/2006 | Haaramo et al. |
| 7,047,202 | B2 | 5/2006 | Jaipuria et al. |
| 7,062,024 | B2 | 6/2006 | Kreckel et al. |
| 7,069,308 | B2 | 6/2006 | Abrams |
| 7,072,678 | B2 | 7/2006 | Allison |
| 7,079,499 | B1 | 7/2006 | Akhtar et al. |
| 7,080,371 | B1 | 7/2006 | Arnaiz et al. |
| 7,082,316 | B2 | 7/2006 | Eiden et al. |
| 7,085,365 | B2 | 8/2006 | Kauppinen |
| 7,096,030 | B2 | 8/2006 | Huomo |
| 7,100,821 | B2 | 9/2006 | Rasti |
| 7,103,432 | B2 | 9/2006 | Drader et al. |
| 7,120,692 | B2 | 10/2006 | Hesselink et al. |
| 7,120,928 | B2 | 10/2006 | Sheth et al. |
| 7,130,839 | B2 | 10/2006 | Boreham et al. |
| 7,136,645 | B2 | 11/2006 | Hanson et al. |
| 7,139,555 | B2 | 11/2006 | Apfel |
| 7,139,565 | B2 | 11/2006 | Fiatal et al. |
| 7,140,549 | B2 | 11/2006 | de Jong |
| 7,146,645 | B1 | 12/2006 | Hellsten et al. |
| 7,149,780 | B2 | 12/2006 | Quine et al. |
| 7,149,789 | B2 | 12/2006 | Slivka et al. |
| 7,149,959 | B1 | 12/2006 | Jones et al. |
| 7,162,241 | B2 | 1/2007 | Kim et al. |
| 7,165,727 | B2 | 1/2007 | de Jong |
| 7,172,118 | B2 | 2/2007 | Urken |
| 7,181,228 | B2 | 2/2007 | Boesch |
| 7,184,790 | B2 | 2/2007 | Dorenbosch et al. |
| 7,185,362 | B2 | 2/2007 | Hawkes et al. |
| 7,194,273 | B2 | 3/2007 | Vaudreuil |
| 7,200,390 | B1 | 4/2007 | Henager et al. |
| 7,203,733 | B1 | 4/2007 | Bern |
| 7,206,806 | B2 | 4/2007 | Pineau |
| 7,209,757 | B2 | 4/2007 | Naghian et al. |
| 7,210,121 | B2 | 4/2007 | Xia et al. |
| 7,219,139 | B2 | 5/2007 | Martin et al. |
| 7,219,222 | B1 | 5/2007 | Durbin et al. |
| 7,224,957 | B2 | 5/2007 | Spector |
| 7,231,206 | B2 | 6/2007 | Cudak et al. |
| 7,233,795 | B1 | 6/2007 | Ryden |
| 7,234,111 | B2 | 6/2007 | Chu et al. |
| 7,239,877 | B2 | 7/2007 | Corneille et al. |
| 7,240,095 | B1 | 7/2007 | Lewis |
| 7,242,680 | B2 | 7/2007 | Gallant |
| 7,245,926 | B2 | 7/2007 | Liao et al. |
| 7,257,391 | B2 | 8/2007 | Burgess et al. |
| 7,257,639 | B1 | 8/2007 | Li et al. |
| 7,259,666 | B1 | 8/2007 | Hermsmeyer et al. |
| 7,260,552 | B2 | 8/2007 | Riera Jorba et al. |
| 7,260,590 | B1 | 8/2007 | Williams |
| 7,260,651 | B2 | 8/2007 | Parrella et al. |
| 7,272,830 | B2 | 9/2007 | de Jong |
| 7,277,408 | B2 | 10/2007 | Sorsa |
| 7,284,664 | B1 | 10/2007 | Ivchenko et al. |
| 7,289,792 | B1 | 10/2007 | Turunen |
| 7,289,964 | B1 | 10/2007 | Bowman-Amuah |
| 7,289,971 | B1 | 10/2007 | O'Neil et al. |
| 7,293,107 | B1 | 11/2007 | Hanson et al. |
| 7,295,853 | B2 | 11/2007 | Jin et al. |
| 7,296,155 | B1 | 11/2007 | Trostle et al. |
| 7,305,252 | B2 | 12/2007 | Britt et al. |
| 7,305,700 | B2 * | 12/2007 | Boynton et al. .................. 726/4 |
| 7,310,350 | B1 | 12/2007 | Shao et al. |
| 7,310,729 | B2 | 12/2007 | Gordon et al. |
| 7,324,473 | B2 | 1/2008 | Corneille et al. |
| 7,349,871 | B2 | 3/2008 | Labrou et al. |
| 7,353,274 | B1 | 4/2008 | Rouhi et al. |
| 7,359,720 | B2 | 4/2008 | Hartmaier et al. |
| 7,373,386 | B2 | 5/2008 | Gardner et al. |
| 7,374,099 | B2 | 5/2008 | de Jong |
| 7,376,701 | B2 | 5/2008 | Bhargava et al. |
| 7,382,879 | B1 | 6/2008 | Miller |
| 7,388,950 | B2 | 6/2008 | Elsey et al. |
| 7,389,412 | B2 | 6/2008 | Sharma et al. |

| | | | | | |
|---|---|---|---|---|---|
| 7,392,483 B2 | 6/2008 | Wong et al. | 8,194,680 B1 | 6/2012 | Brandwine et al. |
| 7,395,329 B1 | 7/2008 | Holt et al. | 8,204,953 B2 | 6/2012 | Luna et al. |
| 7,398,271 B1 | 7/2008 | Borkovsky et al. | 8,209,709 B2 | 6/2012 | Fleming |
| 7,430,609 B2 | 9/2008 | Brown et al. | 8,260,852 B1 | 9/2012 | Cselle |
| 7,441,271 B2 | 10/2008 | Fiatal et al. | 2001/0009025 A1 | 7/2001 | Ahonen |
| 7,443,847 B1 | 10/2008 | Albert et al. | 2001/0010046 A1 | 7/2001 | Muyres et al. |
| 7,461,071 B2 | 12/2008 | Fitzpatrick et al. | 2001/0013069 A1 | 8/2001 | Shah |
| 7,465,231 B2 | 12/2008 | Lewin et al. | 2001/0023414 A1 | 9/2001 | Kumar et al. |
| 7,469,125 B2 | 12/2008 | Nurmi | 2001/0029524 A1 | 10/2001 | Smith et al. |
| 7,483,036 B2 | 1/2009 | Moore | 2001/0032254 A1 | 10/2001 | Hawkins |
| 7,499,537 B2 | 3/2009 | Elsey et al. | 2001/0034225 A1 | 10/2001 | Gupte et al. |
| 7,502,615 B2 | 3/2009 | Wilhoite et al. | 2001/0034244 A1 | 10/2001 | Calder et al. |
| 7,519,042 B2 | 4/2009 | Gorday et al. | 2001/0037453 A1 | 11/2001 | Mitty et al. |
| 7,532,571 B1 | 5/2009 | Price et al. | 2001/0039191 A1 | 11/2001 | Maierhofer |
| 7,539,665 B2 | 5/2009 | Mendez | 2001/0041566 A1 | 11/2001 | Xanthos et al. |
| 7,548,947 B2 | 6/2009 | Kasriel et al. | 2001/0042009 A1 | 11/2001 | Montague |
| 7,548,969 B2 | 6/2009 | Tripp et al. | 2001/0042099 A1 | 11/2001 | Peng |
| 7,551,900 B2 | 6/2009 | Kang et al. | 2001/0043148 A1 | 11/2001 | Stewart |
| 7,567,575 B2 | 7/2009 | Chen et al. | 2001/0052052 A1 | 12/2001 | Peng |
| 7,574,208 B2 | 8/2009 | Hanson et al. | 2001/0053687 A1 | 12/2001 | Sivula |
| 7,575,171 B2 | 8/2009 | Lev | 2002/0002478 A1 | 1/2002 | Swart et al. |
| 7,584,294 B2 | 9/2009 | Plamondon | 2002/0002591 A1 | 1/2002 | Ketola |
| 7,587,482 B2 | 9/2009 | Henderson et al. | 2002/0007303 A1 | 1/2002 | Brookler et al. |
| 7,587,608 B2 | 9/2009 | Haller et al. | 2002/0013727 A1 | 1/2002 | Lee |
| 7,593,714 B2 | 9/2009 | Schultz et al. | 2002/0019225 A1 | 2/2002 | Miyashita |
| 7,596,608 B2 | 9/2009 | Alexander et al. | 2002/0019812 A1 | 2/2002 | Board et al. |
| 7,596,791 B2 | 9/2009 | Wei et al. | 2002/0035556 A1 | 3/2002 | Shah et al. |
| 7,613,792 B2 | 11/2009 | Zervas et al. | 2002/0035617 A1 | 3/2002 | Lynch et al. |
| 7,630,986 B1 | 12/2009 | Herz et al. | 2002/0038253 A1 | 3/2002 | Seaman et al. |
| 7,634,558 B1 | 12/2009 | Mangal et al. | 2002/0042875 A1 | 4/2002 | Shukla |
| 7,643,818 B2 | 1/2010 | Backholm et al. | 2002/0049818 A1 | 4/2002 | Gilhuly et al. |
| 7,644,166 B2 | 1/2010 | Appelman et al. | 2002/0049828 A1 | 4/2002 | Pekarek-Kostka |
| 7,650,416 B2 | 1/2010 | Wu et al. | 2002/0053078 A1 | 5/2002 | Holtz et al. |
| 7,672,291 B2 | 3/2010 | Wang | 2002/0055351 A1 | 5/2002 | Elsey et al. |
| 7,672,439 B2 | 3/2010 | Appelman et al. | 2002/0059201 A1 | 5/2002 | Work |
| 7,680,281 B2 | 3/2010 | Fiatal et al. | 2002/0059457 A1 | 5/2002 | Ballard et al. |
| 7,684,346 B2 | 3/2010 | Valli | 2002/0068559 A1 | 6/2002 | Sharma et al. |
| 7,689,664 B2 | 3/2010 | Karlberg | 2002/0073207 A1 | 6/2002 | Widger et al. |
| 7,693,555 B2 | 4/2010 | Srinivasan et al. | 2002/0077077 A1 | 6/2002 | Rezvani et al. |
| 7,693,944 B2 | 4/2010 | Appelman et al. | 2002/0077084 A1 | 6/2002 | Zellner et al. |
| 7,694,008 B2 | 4/2010 | Chang et al. | 2002/0078384 A1 | 6/2002 | Hippelainen |
| 7,706,781 B2 | 4/2010 | Backholm et al. | 2002/0087549 A1 | 7/2002 | Mostafa |
| 7,707,573 B1 | 4/2010 | Marmaros et al. | 2002/0087679 A1 | 7/2002 | Pulley et al. |
| 7,752,633 B1 | 7/2010 | Fleming | 2002/0087883 A1 | 7/2002 | Wohlgemuth et al. |
| 7,757,956 B2 | 7/2010 | Koenck et al. | 2002/0089542 A1 | 7/2002 | Imamura |
| 7,769,395 B2 | 8/2010 | Fiatal et al. | 2002/0091921 A1* | 7/2002 | Kunzinger .................. 713/153 |
| 7,769,400 B2 | 8/2010 | Backholm et al. | 2002/0095319 A1 | 7/2002 | Swart et al. |
| 7,769,805 B1 | 8/2010 | Barnes et al. | 2002/0095328 A1 | 7/2002 | Swart et al. |
| 7,778,792 B2 | 8/2010 | Huang et al. | 2002/0095391 A1 | 7/2002 | Swart et al. |
| 7,783,757 B2 | 8/2010 | Plamondon | 2002/0095399 A1 | 7/2002 | Devine et al. |
| 7,796,742 B1 | 9/2010 | Sutaria et al. | 2002/0098855 A1 | 7/2002 | Hartmaier et al. |
| 7,797,064 B2 | 9/2010 | Loomis et al. | 2002/0099613 A1 | 7/2002 | Swart et al. |
| 7,809,818 B2 | 10/2010 | Plamondon | 2002/0099809 A1 | 7/2002 | Lee |
| 7,827,055 B1 | 11/2010 | Snodgrass et al. | 2002/0101975 A1 | 8/2002 | Tiburtius et al. |
| 7,827,597 B2 | 11/2010 | Boynton et al. | 2002/0103934 A1 | 8/2002 | Fishman et al. |
| 7,853,563 B2 | 12/2010 | Alvarado et al. | 2002/0107944 A1 | 8/2002 | Bai et al. |
| 7,877,703 B1 | 1/2011 | Fleming | 2002/0107985 A1 | 8/2002 | Hwang et al. |
| 7,881,745 B1 | 2/2011 | Rao et al. | 2002/0116499 A1 | 8/2002 | Ennus et al. |
| 7,899,996 B1 | 3/2011 | Levin-Michael | 2002/0116501 A1 | 8/2002 | Ho et al. |
| 7,908,656 B1 | 3/2011 | Mu | 2002/0120388 A1 | 8/2002 | Bullock |
| 7,917,468 B2 | 3/2011 | Ariel et al. | 2002/0120766 A1 | 8/2002 | Okajima et al. |
| 7,917,505 B2 | 3/2011 | van Gent et al. | 2002/0120779 A1 | 8/2002 | Teeple et al. |
| 7,921,167 B2 | 4/2011 | Shroff et al. | 2002/0126701 A1 | 9/2002 | Requena |
| 7,930,416 B2 | 4/2011 | Miller et al. | 2002/0133504 A1 | 9/2002 | Vlahos et al. |
| 7,933,929 B1 | 4/2011 | McClendon et al. | 2002/0144109 A1 | 10/2002 | Benantar et al. |
| 7,937,091 B2 | 5/2011 | Roman et al. | 2002/0146129 A1 | 10/2002 | Kaplan |
| 7,970,860 B2 | 6/2011 | Kline et al. | 2002/0152379 A1 | 10/2002 | Gefwert et al. |
| 7,996,487 B2 | 8/2011 | Snyder | 2002/0155848 A1 | 10/2002 | Suryanarayana |
| 8,005,891 B2 | 8/2011 | Knowles et al. | 2002/0156839 A1 | 10/2002 | Peterson et al. |
| 8,010,082 B2 | 8/2011 | Sutaria et al. | 2002/0158908 A1 | 10/2002 | Vaajala et al. |
| 8,032,409 B1 | 10/2011 | Mikurak | 2002/0161587 A1 | 10/2002 | Pitts, III et al. |
| 8,064,583 B1 | 11/2011 | Sutaria et al. | 2002/0161925 A1 | 10/2002 | Munger et al. |
| 8,069,166 B2 | 11/2011 | Alvarado et al. | 2002/0161928 A1 | 10/2002 | Ndili |
| 8,078,158 B2 | 12/2011 | Backholm | 2002/0164977 A1 | 11/2002 | Link, II et al. |
| 8,107,921 B2 | 1/2012 | Fiatal | 2002/0167484 A1 | 11/2002 | Hatanaka et al. |
| 8,116,214 B2 | 2/2012 | Backholm et al. | 2002/0174189 A1 | 11/2002 | Peng |
| 8,127,342 B2 | 2/2012 | Boynton et al. | 2002/0186848 A1 | 12/2002 | Shaik |
| 8,166,164 B1 | 4/2012 | Luna et al. | 2002/0188940 A1 | 12/2002 | Breckner et al. |
| 8,190,701 B2 | 5/2012 | Luna et al. | 2002/0193094 A1 | 12/2002 | Lawless et al. |

| | | |
|---|---|---|
| 2002/0194209 A1 | 12/2002 | Bolosky et al. |
| 2002/0198027 A1 | 12/2002 | Rydbeck |
| 2003/0005151 A1 | 1/2003 | Ullman et al. |
| 2003/0014491 A1 | 1/2003 | Horvitz et al. |
| 2003/0022662 A1 | 1/2003 | Mittal |
| 2003/0023692 A1 | 1/2003 | Moroo |
| 2003/0023975 A1 | 1/2003 | Schrader et al. |
| 2003/0028430 A1 | 2/2003 | Zimmerman |
| 2003/0028441 A1 | 2/2003 | Barsness et al. |
| 2003/0046433 A1 | 3/2003 | Luzzatti et al. |
| 2003/0046586 A1 | 3/2003 | Bheemarasetti et al. |
| 2003/0046587 A1 | 3/2003 | Bheemarasetti et al. |
| 2003/0050041 A1 | 3/2003 | Wu |
| 2003/0054810 A1 | 3/2003 | Chen et al. |
| 2003/0056096 A1 | 3/2003 | Albert et al. |
| 2003/0060188 A1 | 3/2003 | Gidron et al. |
| 2003/0063120 A1 | 4/2003 | Wong et al. |
| 2003/0065738 A1 | 4/2003 | Yang et al. |
| 2003/0065739 A1 | 4/2003 | Shnier |
| 2003/0065802 A1 | 4/2003 | Vitikainen et al. |
| 2003/0070061 A1 | 4/2003 | Wong et al. |
| 2003/0072451 A1 | 4/2003 | Pimentel et al. |
| 2003/0078880 A1 | 4/2003 | Alley et al. |
| 2003/0084165 A1 | 5/2003 | Kjellberg et al. |
| 2003/0088629 A1 | 5/2003 | Berkowitz et al. |
| 2003/0093691 A1 | 5/2003 | Simon et al. |
| 2003/0097381 A1 | 5/2003 | Detweiler et al. |
| 2003/0100321 A1 | 5/2003 | Rao et al. |
| 2003/0100326 A1 | 5/2003 | Grube et al. |
| 2003/0117432 A1 | 6/2003 | Kautto-Kiovula et al. |
| 2003/0120685 A1 | 6/2003 | Duncombe et al. |
| 2003/0125023 A1 | 7/2003 | Fishler |
| 2003/0126216 A1 | 7/2003 | Avila et al. |
| 2003/0130984 A1 | 7/2003 | Quinlan et al. |
| 2003/0145038 A1 | 7/2003 | Bin Tariq et al. |
| 2003/0146934 A1 | 8/2003 | Bailey et al. |
| 2003/0153338 A1 | 8/2003 | Herz et al. |
| 2003/0154212 A1 | 8/2003 | Schirmer et al. |
| 2003/0156146 A1 | 8/2003 | Suomela et al. |
| 2003/0157947 A1 | 8/2003 | Fiatal et al. |
| 2003/0169262 A1 | 9/2003 | Lavelle et al. |
| 2003/0177281 A1 | 9/2003 | McQuillan et al. |
| 2003/0182431 A1 | 9/2003 | Sturniolo et al. |
| 2003/0187984 A1 | 10/2003 | Banavar et al. |
| 2003/0204605 A1 | 10/2003 | Hudson et al. |
| 2003/0208529 A1 | 11/2003 | Pendyala et al. |
| 2003/0208559 A1 | 11/2003 | Velline et al. |
| 2003/0210666 A1 | 11/2003 | Trossen et al. |
| 2003/0211845 A1 | 11/2003 | Lohtia et al. |
| 2003/0217098 A1 | 11/2003 | Bobde et al. |
| 2003/0217142 A1 | 11/2003 | Bobde et al. |
| 2003/0223554 A1 | 12/2003 | Zhang |
| 2003/0227487 A1 | 12/2003 | Hugh |
| 2003/0227745 A1 | 12/2003 | Khoo |
| 2003/0235308 A1 | 12/2003 | Boynton et al. |
| 2003/0236857 A1 | 12/2003 | Takase et al. |
| 2003/0236981 A1 | 12/2003 | Marmigere et al. |
| 2004/0002324 A1 | 1/2004 | Juntunen et al. |
| 2004/0006630 A1 | 1/2004 | Friend et al. |
| 2004/0015504 A1 | 1/2004 | Ahad et al. |
| 2004/0024795 A1 | 2/2004 | Hind et al. |
| 2004/0024824 A1 | 2/2004 | Ferguson et al. |
| 2004/0024892 A1 | 2/2004 | Creswell et al. |
| 2004/0027326 A1 | 2/2004 | Hays et al. |
| 2004/0027375 A1 | 2/2004 | Ellis et al. |
| 2004/0027378 A1 | 2/2004 | Hays et al. |
| 2004/0043770 A1 | 3/2004 | Amit et al. |
| 2004/0049579 A1 | 3/2004 | Ims et al. |
| 2004/0049599 A1 | 3/2004 | Friend et al. |
| 2004/0051715 A1 | 3/2004 | Brokenshire et al. |
| 2004/0054719 A1 | 3/2004 | Daigle et al. |
| 2004/0054739 A1 | 3/2004 | Friend et al. |
| 2004/0064445 A1 | 4/2004 | Pfleging et al. |
| 2004/0064488 A1 | 4/2004 | Sinha |
| 2004/0068579 A1 | 4/2004 | Marmigere et al. |
| 2004/0068698 A1 | 4/2004 | Wu et al. |
| 2004/0073476 A1 | 4/2004 | Donahue et al. |
| 2004/0073651 A1 | 4/2004 | Beaulieu et al. |
| 2004/0075675 A1 | 4/2004 | Raivisto et al. |
| 2004/0075695 A1 | 4/2004 | Chew et al. |
| 2004/0078814 A1 | 4/2004 | Allen |
| 2004/0080515 A1 | 4/2004 | Hagiwara |
| 2004/0082346 A1 | 4/2004 | Skytt et al. |
| 2004/0098625 A1 | 5/2004 | Lagadec et al. |
| 2004/0103147 A1 | 5/2004 | Flesher et al. |
| 2004/0107319 A1 | 6/2004 | D'Orto et al. |
| 2004/0110497 A1 | 6/2004 | Little |
| 2004/0120323 A1 | 6/2004 | Viikari et al. |
| 2004/0123095 A1 | 6/2004 | Marshall |
| 2004/0123304 A1 | 6/2004 | Black et al. |
| 2004/0127214 A1 | 7/2004 | Reddy et al. |
| 2004/0128375 A1 | 7/2004 | Rockwell |
| 2004/0133626 A1 | 7/2004 | Herrero et al. |
| 2004/0141011 A1 | 7/2004 | Smethers et al. |
| 2004/0147248 A1 | 7/2004 | Will |
| 2004/0147262 A1 | 7/2004 | Lescuyer et al. |
| 2004/0148375 A1 | 7/2004 | Levett et al. |
| 2004/0158611 A1 | 8/2004 | Daniell et al. |
| 2004/0167966 A1 | 8/2004 | Lee et al. |
| 2004/0170257 A1 | 9/2004 | Gross et al. |
| 2004/0172481 A1 | 9/2004 | Engstrom |
| 2004/0176128 A1 | 9/2004 | Grabelsky et al. |
| 2004/0177369 A1 | 9/2004 | Akins, III |
| 2004/0179513 A1 | 9/2004 | Smith et al. |
| 2004/0181550 A1 | 9/2004 | Warsta et al. |
| 2004/0184475 A1 | 9/2004 | Meier |
| 2004/0186902 A1 | 9/2004 | Stewart |
| 2004/0189610 A1 | 9/2004 | Friend |
| 2004/0199497 A1 | 10/2004 | Timmons |
| 2004/0199582 A1 | 10/2004 | Kucharewski et al. |
| 2004/0199663 A1 | 10/2004 | Horvitz et al. |
| 2004/0205248 A1 | 10/2004 | Little et al. |
| 2004/0205330 A1 | 10/2004 | Godfrey et al. |
| 2004/0209602 A1 | 10/2004 | Joyce et al. |
| 2004/0210639 A1 | 10/2004 | Ben-Yoseph et al. |
| 2004/0219940 A1 | 11/2004 | Kong et al. |
| 2004/0230619 A1 | 11/2004 | Blanco et al. |
| 2004/0233930 A1 | 11/2004 | Colby, Jr. |
| 2004/0236792 A1 | 11/2004 | Celik |
| 2004/0242209 A1 | 12/2004 | Kruis et al. |
| 2004/0252816 A1 | 12/2004 | Nicolas |
| 2004/0255126 A1 | 12/2004 | Reith |
| 2004/0258231 A1 | 12/2004 | Elsey et al. |
| 2004/0259535 A1 | 12/2004 | Elsey et al. |
| 2004/0259537 A1 | 12/2004 | Ackley |
| 2004/0260948 A1 | 12/2004 | Miyata et al. |
| 2004/0264396 A1 | 12/2004 | Ginzburg et al. |
| 2004/0266364 A1 | 12/2004 | Nguyen et al. |
| 2004/0268148 A1 | 12/2004 | Karjala et al. |
| 2005/0002501 A1 | 1/2005 | Elsey et al. |
| 2005/0002508 A1 | 1/2005 | Elsey et al. |
| 2005/0002509 A1 | 1/2005 | Elsey et al. |
| 2005/0002510 A1 | 1/2005 | Elsey et al. |
| 2005/0010694 A1 | 1/2005 | Ma et al. |
| 2005/0015432 A1 | 1/2005 | Cohen |
| 2005/0021750 A1 | 1/2005 | Abrams |
| 2005/0022000 A1 | 1/2005 | Inomata et al. |
| 2005/0022182 A1 | 1/2005 | Mittal |
| 2005/0027591 A9 | 2/2005 | Gailey et al. |
| 2005/0027716 A1 | 2/2005 | Apfel |
| 2005/0027869 A1 | 2/2005 | Johnson |
| 2005/0033812 A1 | 2/2005 | McCarthy et al. |
| 2005/0033926 A1 | 2/2005 | Dumont |
| 2005/0037741 A1 | 2/2005 | Gilbert |
| 2005/0038707 A1 | 2/2005 | Roever et al. |
| 2005/0038724 A1 | 2/2005 | Roever et al. |
| 2005/0038863 A1 | 2/2005 | Onyon et al. |
| 2005/0041793 A1 | 2/2005 | Fulton et al. |
| 2005/0044144 A1 | 2/2005 | Malik et al. |
| 2005/0055578 A1 | 3/2005 | Wright et al. |
| 2005/0063544 A1 | 3/2005 | Uusitalo et al. |
| 2005/0071489 A1 | 3/2005 | Parupudi et al. |
| 2005/0071674 A1 | 3/2005 | Chou et al. |
| 2005/0073982 A1 | 4/2005 | Corneille et al. |
| 2005/0076136 A1 | 4/2005 | Cho et al. |
| 2005/0076241 A1 | 4/2005 | Appelman |
| 2005/0086540 A1 | 4/2005 | Gunter et al. |
| 2005/0094625 A1 | 5/2005 | Bouat |

| | | | | | |
|---|---|---|---|---|---|
| 2005/0097225 A1 | 5/2005 | Glatt et al. | 2006/0075028 A1 | 4/2006 | Zager et al. |
| 2005/0097570 A1 | 5/2005 | Bomers | 2006/0084410 A1 | 4/2006 | Sutaria et al. |
| 2005/0101307 A1 | 5/2005 | Brugge et al. | 2006/0085503 A1 | 4/2006 | Stoye et al. |
| 2005/0102257 A1 | 5/2005 | Onyon et al. | 2006/0093026 A1 | 5/2006 | Montojo et al. |
| 2005/0102328 A1 | 5/2005 | Ring et al. | 2006/0093135 A1 | 5/2006 | Fiatal et al. |
| 2005/0102351 A1 | 5/2005 | Jiang et al. | 2006/0099969 A1 | 5/2006 | Staton et al. |
| 2005/0108427 A1 | 5/2005 | Datta | 2006/0099970 A1 | 5/2006 | Morgan et al. |
| 2005/0117606 A1 | 6/2005 | Kim | 2006/0112177 A1 | 5/2006 | Barkley et al. |
| 2005/0120082 A1 | 6/2005 | Hesselink et al. | 2006/0123042 A1 | 6/2006 | Xie et al. |
| 2005/0120084 A1 | 6/2005 | Hu et al. | 2006/0132495 A1 | 6/2006 | Anderson |
| 2005/0120181 A1 | 6/2005 | Arunagirinathan et al. | 2006/0141962 A1 | 6/2006 | Forbes et al. |
| 2005/0122333 A1 | 6/2005 | Sumanaweera et al. | 2006/0143464 A1 | 6/2006 | Ananthanarayanan et al. |
| 2005/0124332 A1 | 6/2005 | Clark et al. | 2006/0149591 A1 | 7/2006 | Hauf et al. |
| 2005/0138111 A1 | 6/2005 | Aton et al. | 2006/0149843 A1 | 7/2006 | Rhoads et al. |
| 2005/0138176 A1 | 6/2005 | Singh et al. | 2006/0149970 A1 | 7/2006 | Imazu |
| 2005/0144219 A1 | 6/2005 | Terada | 2006/0155822 A1 | 7/2006 | Yang et al. |
| 2005/0147130 A1 | 7/2005 | Hurwitz et al. | 2006/0161621 A1 | 7/2006 | Rosenberg |
| 2005/0154698 A1 | 7/2005 | Ikezawa et al. | 2006/0165226 A1 | 7/2006 | Ernst et al. |
| 2005/0154796 A1 | 7/2005 | Forsyth | 2006/0167969 A1 | 7/2006 | Andreev et al. |
| 2005/0154836 A1 | 7/2005 | Steeley et al. | 2006/0168043 A1 | 7/2006 | Eisenberger et al. |
| 2005/0155027 A1 | 7/2005 | Wei | 2006/0168164 A1 | 7/2006 | Lemson |
| 2005/0164703 A1 | 7/2005 | Huynh | 2006/0179410 A1 | 8/2006 | Deeds |
| 2005/0164721 A1 | 7/2005 | Eric Yeh et al. | 2006/0188864 A1 | 8/2006 | Shah |
| 2005/0165909 A1 | 7/2005 | Cromer et al. | 2006/0190428 A1 | 8/2006 | Jung et al. |
| 2005/0170776 A1 | 8/2005 | Siorpaes | 2006/0190569 A1 | 8/2006 | Neil et al. |
| 2005/0183143 A1 | 8/2005 | Anderholm et al. | 2006/0190984 A1 | 8/2006 | Heard et al. |
| 2005/0188038 A1 | 8/2005 | Yabe | 2006/0192014 A1 | 8/2006 | Hamilton et al. |
| 2005/0193036 A1 | 9/2005 | Phillips et al. | 2006/0195570 A1 | 8/2006 | Zellner et al. |
| 2005/0193096 A1 | 9/2005 | Yu et al. | 2006/0209842 A1 | 9/2006 | Creamer et al. |
| 2005/0198170 A1 | 9/2005 | LeMay et al. | 2006/0212531 A1 | 9/2006 | Kikkawa et al. |
| 2005/0203966 A1 | 9/2005 | Labrou et al. | 2006/0224629 A1 | 10/2006 | Alexander et al. |
| 2005/0210104 A1 | 9/2005 | Torvinen | 2006/0230394 A1 | 10/2006 | Forth et al. |
| 2005/0210125 A1 | 9/2005 | Li | 2006/0240804 A1 | 10/2006 | Backholm et al. |
| 2005/0222891 A1 | 10/2005 | Chan et al. | 2006/0240805 A1 | 10/2006 | Backholm et al. |
| 2005/0228812 A1 | 10/2005 | Hansmann et al. | 2006/0242137 A1 | 10/2006 | Shah et al. |
| 2005/0232295 A1 | 10/2005 | Young | 2006/0242210 A1 | 10/2006 | Ring et al. |
| 2005/0234860 A1 | 10/2005 | Roever et al. | 2006/0242320 A1 | 10/2006 | Nettle et al. |
| 2005/0235214 A1 | 10/2005 | Shimizu et al. | 2006/0242607 A1 | 10/2006 | Hudson |
| 2005/0246139 A1 | 11/2005 | Rivenbark et al. | 2006/0252435 A1 | 11/2006 | Henderson et al. |
| 2005/0248526 A1 | 11/2005 | Twerdahl et al. | 2006/0253456 A1 | 11/2006 | Pacholec et al. |
| 2005/0251555 A1 | 11/2005 | Little, II | 2006/0253605 A1 | 11/2006 | Sundarrajan et al. |
| 2005/0254443 A1 | 11/2005 | Campbell et al. | 2006/0259923 A1 | 11/2006 | Chiu |
| 2005/0262220 A1 | 11/2005 | Ecklund et al. | 2006/0265595 A1 | 11/2006 | Scottodiluzio |
| 2005/0273804 A1 | 12/2005 | Preisman | 2006/0271884 A1 | 11/2006 | Hurst |
| 2005/0278307 A1 | 12/2005 | Battagin et al. | 2006/0277265 A1 | 12/2006 | Backholm et al. |
| 2005/0278641 A1 | 12/2005 | Mansour et al. | 2006/0277271 A1 | 12/2006 | Morse et al. |
| 2005/0278647 A1 | 12/2005 | Leavitt et al. | 2006/0294071 A1 | 12/2006 | Weare et al. |
| 2005/0288006 A1 | 12/2005 | Apfel | 2006/0294223 A1 | 12/2006 | Glasgow et al. |
| 2006/0012672 A1 | 1/2006 | Schrader et al. | 2007/0005738 A1 | 1/2007 | Alexion-Tiernan et al. |
| 2006/0020525 A1 | 1/2006 | Borelli et al. | 2007/0006317 A1 | 1/2007 | Asami et al. |
| 2006/0020580 A1 | 1/2006 | Dettinger et al. | 2007/0011367 A1 | 1/2007 | Scott et al. |
| 2006/0020804 A1 | 1/2006 | Schleifer et al. | 2007/0019610 A1 | 1/2007 | Backholm et al. |
| 2006/0020947 A1 | 1/2006 | Hallamaa et al. | 2007/0022118 A1 | 1/2007 | Layne |
| 2006/0021023 A1 | 1/2006 | Stewart et al. | 2007/0027775 A1 | 2/2007 | Hwang |
| 2006/0022048 A1 | 2/2006 | Johnson | 2007/0027832 A1 | 2/2007 | Fiatal et al. |
| 2006/0026580 A1 | 2/2006 | Cabillic et al. | 2007/0027886 A1 | 2/2007 | Gent et al. |
| 2006/0029062 A1 | 2/2006 | Rao et al. | 2007/0027917 A1 | 2/2007 | Ariel et al. |
| 2006/0029063 A1 | 2/2006 | Rao et al. | 2007/0027920 A1 | 2/2007 | Alvarado et al. |
| 2006/0029064 A1 | 2/2006 | Rao et al. | 2007/0027921 A1 | 2/2007 | Alvarado et al. |
| 2006/0031114 A1 | 2/2006 | Zommers | 2007/0027930 A1 | 2/2007 | Alvarado et al. |
| 2006/0031300 A1 | 2/2006 | Kock et al. | 2007/0033531 A1 | 2/2007 | Marsh |
| 2006/0031365 A1 | 2/2006 | Kay et al. | 2007/0038567 A1 | 2/2007 | Allaire et al. |
| 2006/0031428 A1 | 2/2006 | Wikman | 2007/0038931 A1 | 2/2007 | Allaire et al. |
| 2006/0031785 A1 | 2/2006 | Raciborski | 2007/0044041 A1 | 2/2007 | Beynon et al. |
| 2006/0037071 A1 | 2/2006 | Rao et al. | 2007/0049258 A1 | 3/2007 | Thibeault |
| 2006/0046686 A1 | 3/2006 | Hawkins et al. | 2007/0060196 A1 | 3/2007 | Sharma |
| 2006/0047844 A1 | 3/2006 | Deng | 2007/0061393 A1 | 3/2007 | Moore |
| 2006/0048061 A1 | 3/2006 | Forlenza et al. | 2007/0067147 A1 | 3/2007 | Huang |
| 2006/0052091 A1 | 3/2006 | Onyon et al. | 2007/0067381 A1 | 3/2007 | Grant et al. |
| 2006/0052137 A1 | 3/2006 | Randall et al. | 2007/0067424 A1 | 3/2007 | Raciborski et al. |
| 2006/0059495 A1 | 3/2006 | Spector | 2007/0070931 A1 | 3/2007 | Lewis et al. |
| 2006/0063544 A1 | 3/2006 | Zhao et al. | 2007/0072617 A1 | 3/2007 | Lewis et al. |
| 2006/0069686 A1 | 3/2006 | Beyda et al. | 2007/0078857 A1 | 4/2007 | Punaganti et al. |
| 2006/0069687 A1 | 3/2006 | Cui et al. | 2007/0078964 A1 | 4/2007 | East et al. |
| 2006/0069715 A1 | 3/2006 | Vayssiere | 2007/0088852 A1 | 4/2007 | Levkovitz |
| 2006/0069742 A1 | 3/2006 | Segre | 2007/0105627 A1 | 5/2007 | Campbell |
| 2006/0069746 A1 | 3/2006 | Davis et al. | 2007/0111764 A1 | 5/2007 | Park et al. |
| 2006/0073810 A1 | 4/2006 | Pyhalammi et al. | 2007/0116223 A1 | 5/2007 | Burke et al. |
| 2006/0074951 A1 | 4/2006 | Beier et al. | 2007/0118620 A1 | 5/2007 | Cartmell et al. |

| | | | | | | |
|---|---|---|---|---|---|---|
| 2007/0130108 A1 | 6/2007 | Simpson et al. | | 2008/0232290 A1 | 9/2008 | Elzur et al. |
| 2007/0130217 A1 | 6/2007 | Linyard et al. | | 2008/0233983 A1 | 9/2008 | Park et al. |
| 2007/0140193 A1 | 6/2007 | Dosa et al. | | 2008/0242370 A1 | 10/2008 | Lando et al. |
| 2007/0147317 A1 | 6/2007 | Smith et al. | | 2008/0263170 A1 | 10/2008 | Caron et al. |
| 2007/0147411 A1 | 6/2007 | Bijwaard et al. | | 2008/0270379 A1 | 10/2008 | Ramakrishna |
| 2007/0150881 A1 | 6/2007 | Khawand et al. | | 2008/0273498 A1 | 11/2008 | Jalil et al. |
| 2007/0156824 A1 | 7/2007 | Thompson | | 2008/0281798 A1 | 11/2008 | Chatterjee et al. |
| 2007/0156842 A1 | 7/2007 | Vermeulen et al. | | 2008/0288659 A1 | 11/2008 | Hasha et al. |
| 2007/0162514 A1 | 7/2007 | Civetta et al. | | 2008/0298386 A1 | 12/2008 | Fiatal |
| 2007/0167178 A1 | 7/2007 | Al-Harbi | | 2008/0299956 A1 | 12/2008 | Bailey et al. |
| 2007/0174433 A1 | 7/2007 | Mendez et al. | | 2008/0301231 A1 | 12/2008 | Mehta et al. |
| 2007/0175998 A1 | 8/2007 | Lev | | 2008/0301300 A1 | 12/2008 | Toub |
| 2007/0198698 A1 | 8/2007 | Boyd et al. | | 2008/0313282 A1 | 12/2008 | Warila et al. |
| 2007/0220080 A1 | 9/2007 | Humphrey | | 2009/0010204 A1 | 1/2009 | Pratt, Jr. et al. |
| 2007/0220099 A1 | 9/2007 | Di Giorgio et al. | | 2009/0010259 A1 | 1/2009 | Sirotkin |
| 2007/0233855 A1 | 10/2007 | Brown et al. | | 2009/0012841 A1 | 1/2009 | Saft et al. |
| 2007/0237318 A1 | 10/2007 | McGary | | 2009/0016526 A1 | 1/2009 | Fiatal et al. |
| 2007/0245010 A1 | 10/2007 | Arn et al. | | 2009/0019485 A1 | 1/2009 | Ellis et al. |
| 2007/0249365 A1 | 10/2007 | Jendbro | | 2009/0019532 A1 | 1/2009 | Jacobsen et al. |
| 2007/0250591 A1 | 10/2007 | Milic-Frayling et al. | | 2009/0024794 A1 | 1/2009 | Iyer et al. |
| 2007/0254631 A1 | 11/2007 | Spooner | | 2009/0031006 A1 | 1/2009 | Johnson |
| 2007/0255848 A1 | 11/2007 | Sewall et al. | | 2009/0052372 A1 | 2/2009 | Durazzo et al. |
| 2007/0264993 A1 | 11/2007 | Hughes | | 2009/0054034 A1 | 2/2009 | Backholm et al. |
| 2007/0267492 A1 | 11/2007 | Maclaine Pont | | 2009/0055353 A1 | 2/2009 | Meema |
| 2007/0276925 A1 | 11/2007 | LaJoie et al. | | 2009/0059950 A1 | 3/2009 | Gao et al. |
| 2007/0276926 A1 | 11/2007 | LaJoie et al. | | 2009/0063647 A1 | 3/2009 | Backholm et al. |
| 2007/0288469 A1 | 12/2007 | Shenfield | | 2009/0075683 A1 | 3/2009 | Backholm et al. |
| 2007/0290787 A1 | 12/2007 | Fiatal et al. | | 2009/0077263 A1 | 3/2009 | Koganti et al. |
| 2007/0293207 A1 | 12/2007 | Guedalia et al. | | 2009/0077326 A1 | 3/2009 | Motohashi |
| 2007/0293238 A1 | 12/2007 | Fiatal et al. | | 2009/0094317 A1 | 4/2009 | Venkitaraman |
| 2007/0293958 A1 | 12/2007 | Stehle et al. | | 2009/0100416 A1 | 4/2009 | Brown et al. |
| 2007/0294295 A1 | 12/2007 | Finkelstein et al. | | 2009/0110179 A1 | 4/2009 | Elsey et al. |
| 2007/0294763 A1 | 12/2007 | Udezue et al. | | 2009/0119266 A1 | 5/2009 | Fitzpatrick et al. |
| 2007/0296701 A1 | 12/2007 | Pope et al. | | 2009/0125523 A1 | 5/2009 | Fitzpatrick et al. |
| 2007/0299918 A1 | 12/2007 | Roberts | | 2009/0144632 A1 | 6/2009 | Mendez |
| 2008/0001717 A1 | 1/2008 | Fiatal | | 2009/0147008 A1 | 6/2009 | Do et al. |
| 2008/0008095 A1 | 1/2008 | Gilfix | | 2009/0149203 A1 | 6/2009 | Backholm et al. |
| 2008/0009344 A1 | 1/2008 | Graham et al. | | 2009/0156178 A1 | 6/2009 | Elsey et al. |
| 2008/0016236 A1 | 1/2008 | Beverly et al. | | 2009/0157792 A1 | 6/2009 | Fiatal |
| 2008/0032718 A1 | 2/2008 | Suresh | | 2009/0164433 A1 | 6/2009 | R et al. |
| 2008/0034031 A1 | 2/2008 | Weisbrot et al. | | 2009/0164560 A1 | 6/2009 | Fiatal |
| 2008/0037787 A1 | 2/2008 | Boynton et al. | | 2009/0172565 A1 | 7/2009 | Jackson et al. |
| 2008/0059308 A1 | 3/2008 | Gerken | | 2009/0181641 A1 | 7/2009 | Fiatal |
| 2008/0059398 A1 | 3/2008 | Tsutsui | | 2009/0182500 A1 | 7/2009 | Dicke |
| 2008/0061142 A1 | 3/2008 | Howcroft et al. | | 2009/0187939 A1 | 7/2009 | Lajoie |
| 2008/0068519 A1 | 3/2008 | Adler et al. | | 2009/0191903 A1 | 7/2009 | Fiatal |
| 2008/0077506 A1 | 3/2008 | Rampell et al. | | 2009/0193130 A1 | 7/2009 | Fiatal |
| 2008/0077571 A1 | 3/2008 | Harris et al. | | 2009/0193338 A1 | 7/2009 | Fiatal |
| 2008/0085719 A1 | 4/2008 | Kuchibhotla et al. | | 2009/0215504 A1 | 8/2009 | Lando |
| 2008/0085724 A1 | 4/2008 | Cormier et al. | | 2009/0221326 A1 | 9/2009 | Roussel et al. |
| 2008/0086379 A1 | 4/2008 | Dion et al. | | 2009/0228545 A1 | 9/2009 | Mendez et al. |
| 2008/0091773 A1 | 4/2008 | Hameen-Anttila | | 2009/0241180 A1 | 9/2009 | Fiatal |
| 2008/0103877 A1 | 5/2008 | Gerken | | 2009/0248670 A1 | 10/2009 | Fiatal |
| 2008/0104666 A1 | 5/2008 | Dillaway | | 2009/0248696 A1 | 10/2009 | Rowles et al. |
| 2008/0108298 A1 | 5/2008 | Selen et al. | | 2009/0248794 A1 | 10/2009 | Helms et al. |
| 2008/0114881 A1 | 5/2008 | Lee et al. | | 2009/0248878 A1 | 10/2009 | Tran et al. |
| 2008/0125225 A1 | 5/2008 | Lazaridis et al. | | 2009/0252136 A1 | 10/2009 | Mahany et al. |
| 2008/0130663 A1 | 6/2008 | Fridman et al. | | 2009/0254589 A1 | 10/2009 | Nair et al. |
| 2008/0133326 A1 | 6/2008 | Goncalves et al. | | 2009/0254971 A1 | 10/2009 | Herz et al. |
| 2008/0133641 A1 | 6/2008 | Gent et al. | | 2009/0264138 A1 | 10/2009 | Kang et al. |
| 2008/0133708 A1 | 6/2008 | Alvarado et al. | | 2009/0282125 A1 | 11/2009 | Jeide et al. |
| 2008/0134292 A1 | 6/2008 | Ariel et al. | | 2009/0286531 A1 | 11/2009 | Bhatt et al. |
| 2008/0140665 A1 | 6/2008 | Ariel et al. | | 2009/0287750 A1 | 11/2009 | Banavar et al. |
| 2008/0151817 A1 | 6/2008 | Fitchett et al. | | 2009/0299817 A1 | 12/2009 | Fok et al. |
| 2008/0154870 A1 | 6/2008 | Evermann et al. | | 2009/0307133 A1 | 12/2009 | Holloway et al. |
| 2008/0155613 A1 | 6/2008 | Benya et al. | | 2009/0318171 A1 | 12/2009 | Backholm et al. |
| 2008/0166999 A1 | 7/2008 | Guedalia et al. | | 2009/0323678 A1 | 12/2009 | Wang |
| 2008/0167019 A1 | 7/2008 | Guedalia et al. | | 2009/0325565 A1 | 12/2009 | Backholm |
| 2008/0168145 A1 | 7/2008 | Wilson | | 2009/0327390 A1 | 12/2009 | Tran et al. |
| 2008/0183800 A1 | 7/2008 | Herzog et al. | | 2010/0042691 A1 | 2/2010 | Maguire |
| 2008/0192820 A1 | 8/2008 | Brooks et al. | | 2010/0049872 A1 | 2/2010 | Roskind |
| 2008/0198995 A1 | 8/2008 | McGary et al. | | 2010/0057924 A1 | 3/2010 | Rauber et al. |
| 2008/0201362 A1 | 8/2008 | Multer et al. | | 2010/0069127 A1 | 3/2010 | Fiennes |
| 2008/0201751 A1 | 8/2008 | Ahmed et al. | | 2010/0077035 A1 | 3/2010 | Li et al. |
| 2008/0207182 A1 | 8/2008 | Maharajh et al. | | 2010/0077083 A1 | 3/2010 | Tran et al. |
| 2008/0209491 A1 | 8/2008 | Hasek | | 2010/0083255 A1 | 4/2010 | Bane et al. |
| 2008/0214148 A1 | 9/2008 | Ramer et al. | | 2010/0087167 A1 | 4/2010 | Tsurutome et al. |
| 2008/0216094 A1 | 9/2008 | Anderson et al. | | 2010/0088722 A1 | 4/2010 | Jiang |
| 2008/0220797 A1 | 9/2008 | Meiby et al. | | 2010/0093273 A1 | 4/2010 | Hohl |

| | | |
|---|---|---|
| 2010/0115050 A1 | 5/2010 | Sultenfuss et al. |
| 2010/0118190 A1 | 5/2010 | Salfati et al. |
| 2010/0131593 A1 | 5/2010 | Kihara et al. |
| 2010/0131617 A1 | 5/2010 | Osborne et al. |
| 2010/0146107 A1 | 6/2010 | Fiatal |
| 2010/0149975 A1 | 6/2010 | Tripathi et al. |
| 2010/0174735 A1 | 7/2010 | Fiatal |
| 2010/0174939 A1 | 7/2010 | Vexler |
| 2010/0186011 A1 | 7/2010 | Magenheimer |
| 2010/0207870 A1 | 8/2010 | Cho |
| 2010/0211651 A1 | 8/2010 | Guedalia et al. |
| 2010/0214984 A1 | 8/2010 | Cho et al. |
| 2010/0227594 A1 | 9/2010 | DeVries |
| 2010/0228863 A1 | 9/2010 | Kawauchi |
| 2010/0229096 A1 | 9/2010 | Maiocco et al. |
| 2010/0238915 A1 | 9/2010 | Cayla et al. |
| 2010/0250706 A1 | 9/2010 | Burckart et al. |
| 2010/0250986 A1 | 9/2010 | Black et al. |
| 2010/0268757 A1 | 10/2010 | Fisher |
| 2010/0274983 A1 | 10/2010 | Murphy et al. |
| 2010/0279662 A1 | 11/2010 | Kuusinen et al. |
| 2010/0293335 A1 | 11/2010 | Muthiah et al. |
| 2010/0299223 A1 | 11/2010 | Crouch |
| 2010/0313018 A1 | 12/2010 | Jorgensen |
| 2010/0319054 A1 | 12/2010 | Mehta et al. |
| 2010/0322124 A1 | 12/2010 | Luoma et al. |
| 2010/0325306 A1 | 12/2010 | Vimpari et al. |
| 2011/0028129 A1 | 2/2011 | Hutchison et al. |
| 2011/0040718 A1 | 2/2011 | Tendjoukian et al. |
| 2011/0065424 A1 | 3/2011 | Estevez et al. |
| 2011/0066646 A1 | 3/2011 | Danado et al. |
| 2011/0099363 A1 | 4/2011 | Boynton et al. |
| 2011/0113109 A1 | 5/2011 | LeVasseur et al. |
| 2011/0119134 A1 | 5/2011 | Zivkovic et al. |
| 2011/0126060 A1 | 5/2011 | Grube et al. |
| 2011/0138102 A1 | 6/2011 | Glikson et al. |
| 2011/0138402 A1 | 6/2011 | Fleming |
| 2011/0153937 A1 | 6/2011 | Annamalaisami et al. |
| 2011/0158239 A1 | 6/2011 | Mohaban |
| 2011/0165889 A1 | 7/2011 | Fiatal et al. |
| 2011/0179138 A1 | 7/2011 | Van Geest et al. |
| 2011/0179377 A1 | 7/2011 | Fleming |
| 2011/0182220 A1 | 7/2011 | Black et al. |
| 2011/0184827 A1 | 7/2011 | Hubert |
| 2011/0185355 A1 | 7/2011 | Chawla et al. |
| 2011/0190014 A1 | 8/2011 | Fiatal |
| 2011/0191474 A1 | 8/2011 | Fiatal |
| 2011/0201304 A1 | 8/2011 | Sutaria et al. |
| 2011/0207436 A1 | 8/2011 | van Gent et al. |
| 2011/0208810 A1 | 8/2011 | Li et al. |
| 2011/0213800 A1 | 9/2011 | Saros et al. |
| 2011/0213898 A1 | 9/2011 | Fiatal et al. |
| 2011/0214182 A1 | 9/2011 | Adams et al. |
| 2011/0238772 A1 | 9/2011 | Fiatal |
| 2011/0246950 A1 | 10/2011 | Luna et al. |
| 2011/0252088 A1 | 10/2011 | Fiatal |
| 2011/0264622 A1 | 10/2011 | Vargas et al. |
| 2011/0264731 A1 | 10/2011 | Knowles et al. |
| 2011/0294463 A1 | 12/2011 | Fiatal |
| 2011/0294464 A1 | 12/2011 | Fiatal |
| 2011/0296050 A1 | 12/2011 | Cherukuri |
| 2011/0296120 A1 | 12/2011 | Khan |
| 2011/0296415 A1 | 12/2011 | Khan et al. |
| 2011/0302154 A1 | 12/2011 | Snyder |
| 2012/0005276 A1 | 1/2012 | Guo et al. |
| 2012/0008536 A1 | 1/2012 | Tervahauta et al. |
| 2012/0022980 A1 | 1/2012 | Angelone |
| 2012/0023190 A1 | 1/2012 | Backholm et al. |
| 2012/0023226 A1 | 1/2012 | Petersen et al. |
| 2012/0023236 A1 | 1/2012 | Backholm et al. |
| 2012/0030280 A1 | 2/2012 | Wang et al. |
| 2012/0054386 A1 | 3/2012 | Hanes |
| 2012/0072910 A1 | 3/2012 | Martin et al. |
| 2012/0077482 A1 | 3/2012 | Backholm |
| 2012/0078996 A1 | 3/2012 | Shah |
| 2012/0096092 A1 | 4/2012 | Davidge et al. |
| 2012/0108225 A1 | 5/2012 | Luna et al. |
| 2012/0110109 A1 | 5/2012 | Luna et al. |
| 2012/0110110 A1 | 5/2012 | Luna et al. |
| 2012/0110111 A1 | 5/2012 | Luna et al. |
| 2012/0110112 A1 | 5/2012 | Luna et al. |
| 2012/0110118 A1 | 5/2012 | Luna et al. |
| 2012/0110171 A1 | 5/2012 | Luna et al. |
| 2012/0110173 A1 | 5/2012 | Luna et al. |
| 2012/0110174 A1 | 5/2012 | Wootton et al. |
| 2012/0110275 A1 | 5/2012 | Ganti et al. |
| 2012/0130973 A1 | 5/2012 | Tamm et al. |
| 2012/0131095 A1 | 5/2012 | Luna et al. |
| 2012/0131184 A1 | 5/2012 | Luna et al. |
| 2012/0135726 A1 | 5/2012 | Luna et al. |
| 2012/0140750 A1 | 6/2012 | Yan et al. |
| 2012/0149352 A1 | 6/2012 | Backholm et al. |
| 2012/0151044 A1 | 6/2012 | Luna et al. |
| 2012/0157170 A1 | 6/2012 | Backholm et al. |
| 2012/0158837 A1 | 6/2012 | Kaul |
| 2012/0158908 A1 | 6/2012 | Luna et al. |
| 2012/0170496 A1 | 7/2012 | Yang et al. |
| 2012/0173616 A1 | 7/2012 | Luna et al. |
| 2012/0174220 A1 | 7/2012 | Rodriguez |
| 2012/0176968 A1 | 7/2012 | Luna |
| 2012/0178414 A1 | 7/2012 | Fiatal |
| 2012/0179801 A1 | 7/2012 | Luna et al. |
| 2012/0185597 A1 | 7/2012 | Luna |
| 2012/0185918 A1 | 7/2012 | Backholm et al. |
| 2012/0226767 A1 | 9/2012 | Luna et al. |
| 2012/0227059 A1 | 9/2012 | Fleming |

FOREIGN PATENT DOCUMENTS

| | | |
|---|---|---|
| EP | 1422899 A1 | 5/2004 |
| EP | 1462975 A1 | 9/2004 |
| EP | 1466261 A1 | 10/2004 |
| EP | 1466435 A1 | 10/2004 |
| EP | 1482702 A1 | 12/2004 |
| EP | 1815634 A1 | 8/2007 |
| EP | 1815652 A1 | 8/2007 |
| EP | 1817883 A1 | 8/2007 |
| FI | 117152 B | 6/2006 |
| FI | 118288 B | 9/2007 |
| FI | 119581 B | 12/2008 |
| JP | 4154233 A | 5/1992 |
| JP | 10-336372 A | 12/1998 |
| JP | 2001-218185 A | 8/2001 |
| JP | 2001-350718 A | 12/2001 |
| JP | 2001-356973 A | 12/2001 |
| JP | 2005-515664 T | 5/2005 |
| JP | 2009-207177 A | 9/2009 |
| JP | 4386732 B2 | 10/2009 |
| KR | 2001-0018568 A | 3/2001 |
| KR | 2006-0068186 A | 6/2006 |
| KR | 2007-0071858 A1 | 7/2007 |
| KR | 10-0765238 B1 | 10/2007 |
| KR | 2007-0102091 A1 | 10/2007 |
| KR | 2007-0117874 A | 12/2007 |
| KR | 2009-0077515 A | 7/2009 |
| KR | 2010-0064605 A | 6/2010 |
| WO | WO 97/41661 A2 | 11/1997 |
| WO | WO 98/24257 A1 | 6/1998 |
| WO | WO 98/58322 A2 | 12/1998 |
| WO | WO 01/30130 A2 | 5/2001 |
| WO | WO 03/007570 A1 | 1/2003 |
| WO | WO 03/058483 A1 | 7/2003 |
| WO | WO 03/058879 A1 | 7/2003 |
| WO | WO 03/065701 A | 8/2003 |
| WO | WO 03/098890 A1 | 11/2003 |
| WO | WO 2004/017591 A2 | 2/2004 |
| WO | WO 2004/045171 A1 | 5/2004 |
| WO | WO 2005/015925 A2 | 2/2005 |
| WO | WO 2005/020108 A1 | 3/2005 |
| WO | WO 2006/045005 A1 | 4/2006 |
| WO | WO 2006/045102 A2 | 4/2006 |
| WO | WO 2006/053952 A1 | 5/2006 |
| WO | WO 2006/053954 A1 | 5/2006 |
| WO | WO 2006/058967 A1 | 6/2006 |
| WO | WO 2007/015725 A2 | 2/2007 |
| WO | WO 2007/015726 A1 | 2/2007 |
| WO | WO 2007/149526 A2 | 12/2007 |
| WO | WO 2007/149540 A2 | 12/2007 |
| WO | WO 2008/061042 A2 | 5/2008 |

| | | | |
|---|---|---|---|
| WO | WO 2011/126889 A2 | 10/2011 | |
| WO | WO 2012/018430 A1 | 2/2012 | |
| WO | WO 2012/018431 A1 | 2/2012 | |
| WO | WO 2012/018477 A2 | 2/2012 | |
| WO | WO 2012/018479 A2 | 2/2012 | |
| WO | WO 2012/018556 A2 | 2/2012 | |
| WO | WO 2012/024030 A2 | 2/2012 | |
| WO | WO 2012/060995 A2 | 5/2012 | |
| WO | WO 2012/060996 A2 | 5/2012 | |
| WO | WO 2012/060997 A2 | 5/2012 | |
| WO | WO 2012/061430 A2 | 5/2012 | |
| WO | WO 2012/061433 A2 | 5/2012 | |
| WO | WO 2012/061437 A1 | 5/2012 | |
| WO | WO 2012/071283 A1 | 5/2012 | |
| WO | WO 2012/071384 A2 | 5/2012 | |
| WO | WO 2012/094675 A2 | 7/2012 | |

OTHER PUBLICATIONS

Android Developers, "Date," 10 pages, Oct. 27, 2011.
Augun, Audrey, "Integrating Lotus Notes With Enterprise Data," Lotus Notes Advisory, pp. 22-25, Jul.-Aug. 1996.
Balaban, Bob, "This Is Not Your Fathers Basic: LotusScript in Notes Release 4," The View, vol. 1, Issue 5, 32 pages, Nov.-Dec. 1995.
Bedell, Doug, "Meeting Your New Best Friends Six Degrees Widens Your Contacts in Exchange for Sampling Web Sites," The Dallas Morning News, 4 pages, Oct. 27, 1998.
Bergman, Lawrence D. et al., "Programming-by-Demonstration for Behavior-Based User Interface Customization," IBM Research Report, RC23116, 5 pages, Feb. 20, 2004.
B'Far, Reza et al., "Designing Effective User Interfaces for Wireless Devices," Publication Unknown, 14 pages, Published prior to Feb. 23, 2006.
Blaney, Jeff, "You Can Take It With You—An Introduction to Mobile Computing With Notes R4," The View, vol. 2, Issue 1, 14 pages, Jan.-Feb. 1996.
Braden, R., "Requirements for Internet Hosts—Application and Support," RFC 1123, 80 pages, Oct. 1989.
Brown, Kevin et al., "Mastering Lotus Notes®," Sybex Inc., 996 pages, 1995.
"Chapter: About NotesPump," Publication Unknown, 480 pages, Published prior to Jan. 8, 2003.
"Chapter 13-1—Anatomy of a Note ID," Publication Unknown, 8 pages, Published prior to Jan. 8, 2003.
Cole, Barb et al., "Lotus Airs Notes-to-Database Integration Tool," Network World, 2 pages, Oct. 2, 1995.
"CR 3483 to Release 8 TS 25.331, Rev. 2," 3GPP TSG-RAN2 Meeting #64, Prague, Czech Republic, 11 pages, Nov. 10-14, 2008.
"CR 4100 to Release 8 TS 25.331, Rev. 1," 3GPP TSG-RAN WG2 Meeting #69, San Francisco, U.S., 6 pages, Feb. 22-26, 2010.
Dahl, Andrew, "Lotus Notes® 4 Administrator's Survival Guide," Sams Publishing, 64 pages, 1996.
Decker, Stefan et al., "The Social Semantic Desktop," Digital Enterprise Research Institute, DERI Technical Report 2004-05-02, 7 pages, May 2004.
Elz, R. et al., "Clarifications to the DNS Specification," RFC 2181, 12 pages, Jul. 1997.
European Patent Application No. EP 03705704.9, Supplementary European Search Report, 4 pages, Jun. 9, 2010.
European Patent Application No. EP 03707338.4, Supplementary European Search Report, 2 pages, Apr. 18, 2011.
European Patent Application No. EP 05815115.0, Supplementary European Search Report, 7 pages, Nov. 17, 2011.
Falkner, Mike, "How to Plan, Develop, and Implement Lotus Notes® in Your Organization," John Wiley & Sons, Inc., 539 pages, 1996.
Freeland, Pat et al., "Lotus Notes 3-3.1 For Dummies™," IDG Books Worldwide, 389 pages, 1994.
Frenkel, Garry, "Pumping for Info: Notes and Database Integration," Network Computing, 10 pages, May 1, 1996.
Gameline, Advertisement, 1 page, 1982.
Gewirtz, David, "Lotus Notes 3 Revealed!," Prima Publishing, 261 pages, 1994.
Grous, Paul J., "Creating and Managing a Web Site With Lotus Internotes Web Publisher," The View, vol. 1, Issue 4, 20 pages, Sep.-Oct. 1995.
GSM Association, "Network Efficiency Task Force Fast Dormancy Best Practices," V1.0, 21 pages, May 26, 2010.
Haas, Zygmunt J. et al., "Mobile-TCP: An Asymmetric Transport Protocol for Mobile Systems," IEEE, pp. 1054-1058, 1997.
Haas, Zygmunt J. et al., "The Design and Performance of Mobile TCP for Wireless Networks," Journal of High Speed Networks, vol. 10, pp. 187-207, 2001.
Hajdu, Kalman et al., "Lotus Notes Release 4 in a Multiplatform Environment," IBM Corporation, 173 pages, Feb. 1996.
Hardy, Ed, "Microsoft Proposes Two New Thumb-Driven User Interfaces," Brighthand Consulting, Inc., 2 pages, 2003.
IBM Corporation, "The Architecture of Lotus Notes," White Paper No. 114654, 26 pages, May 31, 1995.
IBM Corporation, "The History of Notes and Domino," Lotus Developer Domain, 11 pages, Sep. 29, 2003.
ImTOO, "ImTOO iPod Movie Converter," 3 pages, Nov. 9, 2005.
IntelliLink Corporation, "IntelliLink® for Windows User's Guide," Version 3.0, 167 pages, 1994.
International Application No. PCT/US2003/000618, International Search Report, 1 page, Apr. 4, 2003.
International Application No. PCT/US2003/000624, International Search Report, 2 pages, May 13, 2003.
International Application No. PCT/US2005/037702, International Preliminary Examination Report, 6 pages, Nov. 20, 2007.
International Application No. PCT/US2005/037702, International Search Report, 1 page, Nov. 5, 2007.
International Application No. PCT/US2005/037702, Written Opinion, 6 pages, Nov. 5, 2007.
International Application No. PCT/US2005/038135, International Search Report, 2 pages, Aug. 8, 2008.
International Application No. PCT/US2005/038135, Written Opinion, 8 pages, Aug. 8, 2008.
International Application No. PCT/US2005/038135, International Preliminary Report on Patentability, 9 pages, Oct. 31, 2011.
International Application No. PCT/FI2005/050424, International Search Report, 4 pages, Mar. 2, 2006.
International Application No. PCT/FI2005/050426, International Search Report, 3 pages, Mar. 1, 2006.
International Application No. PCT/FI2005/050441, International Search Report, 3 pages, Mar. 1, 2006.
International Application No. PCT/US2006/023426, International Search Report, 1 page, Feb. 21, 2007.
International Application No. PCT/US2006/023427, International Search Report, 1 page, Oct. 12, 2006.
International Application No. PCT/US2007/014462, International Search Report, 1 page, Jul. 2, 2008.
International Application No. PCT/US2007/014497, International Search Report, 1 page, Aug. 25, 2008.
International Application No. PCT/US2011/030534, International Search Report, 10 pages, Dec. 29, 2011.
International Application No. PCT/US2011/037932, International Search Report, 9 pages, Jan. 2, 2012.
International Application No. PCT/US2011/037943, International Search Report, 11 pages, Jan. 2, 2012.
International Application No. PCT/US2011/043322, International Search Report, 9 pages, Feb. 9, 2012.
International Application No. PCT/US2011/043328, International Search Report, 12 pages, Feb. 27, 2012.
International Application No. PCT/US2011/043409, International Search Report, 11 pages, Feb. 9, 2012.
International Application No. PCT/US2011/058840, International Search Report, 10 pages, Apr. 26, 2012.
International Application No. PCT/US2011/058848, International Search Report, 10 pages, Apr. 10, 2012.
Japanese Patent Application No. 2003-558726, Office Action, 2 pages, Jun. 10, 2008.
Karlson, Amy K. et al., "AppLens and LaunchTile: Two Designs for One-Handed Thumb Use on Small Devices," Proceedings of CHI 2005, 10 pages, Apr. 2-7, 2005.
Kent, S. et al., "Security Architecture for the Internet Protocol," RFC 2401, The Internet Society, 62 pages, Nov. 1998.

Kleinberg, Jon, "The Small-World Phenomenon: An Algorithmic Perspective," Cornell Computer Science Technical Report 99/1776, 14 pages, Oct. 1999.
Koeppel, Dan, "GUIs Just Want to Have Fun," Wired Magazine, Issue 8.10, 12 pages, Oct. 2000.
Kornblith, Polly Russell, "Lotus Notes Answers: Certified Tech Support," Covers Release 3, McGraw-Hill, Inc., 326 pages, 1994.
Kreisle, Bill, "Teach Yourself . . . Lotus Notes 4," MIS Press, 464 pages, 1996.
Lamb, John P. et al., "Lotus Notes Network Design," McGraw-Hill, 278 pages, 1996.
Londergan, Stephen et al., "Lotus Notes® Release 4 for Dummies®," IDG Books Worldwide, 229 pages, 1996.
Lotus Development Corporation, "Firewall Security Overview and How Firewalls Relate to Lotus Notes," Lotus Notes Knowledge Base, 9 pages, May 22, 1996.
Lotus Development Corporation, "How to Set Up 'Firewall' Protection for a Notes Domain," Lotus Notes Knowledge Base, 2 pages, Nov. 6, 1995.
Lotus Development Corporation, "Lotus Announces Lotus NotesPump 1.0," Lotus Notes Knowledge Base, 6 pages, Oct. 31, 1995.
Lotus Development Corporation, "Lotus Inside Notes—The Architecture of Notes and the Domino Server," 207 pages, 2000.
Lotus Development Corporation, "Lotus NotesPump 1.0 Q & A," Lotus Notes Knowledge Base, 3 pages, Oct. 31, 1995.
Lotus Development Corporation, "Lotus NotesPump: Database Integration for Lotus Notes," Lotus Notes Knowledge Base, 5 pages, Oct. 31, 1995.
Lotus Development Corporation, "Lotus Notes Administration," Release 3.3, 20 pages, 1995.
Lotus Development Corporation, "Lotus Notes Administrators Guide," Release 4, 499 pages, 1995.
Lotus Development Corporation, "Lotus Notes Administrators Guide—Server for NetWare, OS-2, and Unix," Release 3.1, 509 pages, 1994.
Lotus Development Corporation, "Lotus Notes Administrators Guide—Server for Windows," Release 3.1, 345 pages, 1994.
Lotus Development Corporation, "Lotus Notes Application Developers Guide," Release 4, 475 pages, 1995.
Lotus Development Corporation, "Lotus Notes Customer Service Application Guide," Release 3.1, 46 pages, 1994.
Lotus Development Corporation, "Lotus Notes Customer Support Guide," 33 pages, Published prior to Jan. 8, 2003.
Lotus Development Corporation, "Lotus Notes Customer Support Guid—North American Guide," Release 4.1, 51 pages, Published prior to Jan. 8, 2003.
Lotus Development Corporation, "Lotus Notes Database Manager's Guide," Release 4, 115 pages, 1995.
Lotus Development Corporation, "Lotus Notes Deployment Guide," Release 4, 104 pages, 1995.
Lotus Development Corporation, "Lotus Notes for Windows, OS-2, and Macintosh," Release 3.3, 89 pages, 1995.
Lotus Development Corporation, "Lotus Notes Getting Started With Application Development," Release 3.1, 151 pages, 1994.
Lotus Development Corporation, "Lotus Notes Install Guide for Servers," Release 4, 68 pages, 1996.
Lotus Development Corporation, "Lotus Notes Install Guide for Workstations," Release 4, 28 pages, 1995.
Lotus Development Corporation, "Lotus Notes Install Guide for Workstations," Release 4.1, 67 pages, 1996.
Lotus Development Corporation, "Lotus Notes Install Guide for Workstations," Release 4.5, 81 pages, 1996.
Lotus Development Corporation, "Lotus Notes Internet Cookbook for Notes Release 3," 21 pages, Jan. 16, 1996.
Lotus Development Corporation, "Lotus Notes Internet Cookbook for Notes Release 4," 35 pages, Feb. 14, 1996.
Lotus Development Corporation, "Lotus Notes Internotes Web Navigator Administrator's Guide," Release 4, 60 pages, 1995.
Lotus Development Corporation, "Lotus Notes Internotes Web Navigator User's Guide," Release 4, 56 pages, 1995.
Lotus Development Corporation, "Lotus Notes Internotes Web Publisher Guide," Release 4, 122 pages, 1996.
Lotus Development Corporation, "Lotus Notes LotusScript Classes for Notes," Release 4, 6 pages, Published prior to Jan. 8, 2003.
Lotus Development Corporation, "Lotus Notes Migration Guide," Release 4, 110 pages, 1996.
Lotus Development Corporation, "Lotus Notes Network Configuration Guide," Release 4.5, 121 pages, 1996.
Lotus Development Corporation, "Lotus Notes Network Driver Documentation," Release 3.1, 100 pages, 1994.
Lotus Development Corporation, "Lotus Notes Programmer's Guide—Part 1," Release 4, 614 pages, 1995.
Lotus Development Corporation, "Lotus Notes Programmers Guide—Part 2," Release 4, 462 pages, 1995.
Lotus Development Corporation, "Lotus Notes Quick Reference for Application Developers," Release 3, 6 pages, Published prior to Jan. 8, 2003.
Lotus Development Corporation, "Lotus Notes Quick Reference for Macintosh," Release 3, 6 pages, Published prior to Jan. 8, 2003.
Lotus Development Corporation, "Lotus Notes Quick Reference for SmartIcons," Release 3.1, 4 pages, Published prior to Jan. 8, 2003.
Lotus Development Corporation, "Lotus Notes Quick Reference for Windows and Presentation Manager," Release 3, 6 pages, Published prior to Jan. 8, 2003.
Lotus Development Corporation, "Lotus Notes Release Notes," Release 4, 139 pages, 1995.
Lotus Development Corporation, "Lotus Notes Release Notes," Release 4.1, 197 pages, 1996.
Lotus Development Corporation, "Lotus Notes Server for Windows," Release 3.3, 7 pages, 1994.
Lotus Development Corporation, "Lotus Notes Server Up and Running!," Release 4, 13 pages, 1996.
Lotus Development Corporation, "Lotus Notes Site and Systems Planning Guide," Release 3.1, 169 pages, 1994.
Lotus Development Corporation, "Lotus Notes Start Here—Workstation Install for Windows, OS-2 and Macintosh," Release 3.3, 47 pages, 1995.
Lotus Development Corporation, "Lotus Notes Step by Step—A Beginner's Guide to Lotus Notes," Release 4, 179 pages, 1995.
Lotus Development Corporation, "Lotus Notes Step by Step—A Beginner's Guide to Lotus Notes," Release 4.1, 167 pages, 1996.
Lotus Development Corporation, "Lotus Software Agreement," 8 pages, Published prior to Jan. 8, 2003.
Lotus Development Corporation, "What Is the Notes Replicator?," Lotus Notes Knowledge Base, 8 pages, Jul. 5, 1995.
"Lotus Notes Advisor," Advisor Publications Inc., 55 pages, Jun. 1995.
"Lotus Notes Advisor," Advisor Publications Inc., 55 pages, Aug. 1995.
"Lotus Notes Advisor," Advisor Publications Inc., 55 pages, Oct. 1995.
"Lotus Notes Advisor," Advisor Publications Inc., 55 pages, Dec. 1995.
"Lotus Notes Advisor," Advisor Publications Inc., 63 pages, Jan.-Feb. 1996.
"Lotus Notes Advisor," Advisor Publications Inc., 55 pages, Apr. 1996.
"Lotus Notes Advisor," Advisor Publications Inc., 55 pages, Jun. 1996.
"Lotus Notes Advisor," Advisor Publications Inc., 55 pages, Aug. 1996.
"Lotus Notes Advisor," Advisor Publications Inc., 55 pages, Oct. 1996.
"Lotus Notes Advisor," Advisor Publications Inc., 63 pages, Dec. 1996.
"Lotus Notes—Notes Administration Help," Screen Shots, 17 pages, Published prior to Jan. 8, 2003.
MacGregor, Rob et al., "The Domino Defense: Security in Lotus Notes and the Internet," IBM Corporation, 183 pages, Dec. 1997.
Maltz, David A. et al., "MSOCKS: An Architecture for Transport Layer Mobility," IEEE, pp. 1037-1045, 1998.
Marmel, Elaine, "Easy Lotus® Notes Release 4.0," Que Corporation, 237 pages, 1996.
Mason, Luke, "Windows XP: New GUI Design Shows Skin Is In," TechRepublic, 4 pages, Apr. 4, 2001.

McMullen, Melanie, "Network Remote Access and Mobile Computing," Miller Freeman Inc., 226 pages, 1994.
Microsoft, Definition of "Access," Microsoft Computer Dictionary, Fifth Edition, 2 pages, May 1, 2002.
Microsoft, Definition of "Synchronization," Microsoft Computer Dictionary, Fifth Edition, 2 pages, May 1, 2002.
Milgram, Stanley, "The Small-World Problem," Psychology Today, vol. 2, pp. 60-67, 1967.
Miller, Victor S., "Use of Elliptic Curves in Cryptography," Advances in Cryptology—Crypto '85 Proceedings, vol. 218, pp. 417-426, 1985.
Mockapetris, P., "Domain Names—Concepts and Facilities," RFC 1034, 43 pages, Nov. 1987.
Mockapetris, P., "Domain Names—Implementation and Specification," RFC 1035, 43 pages, Nov. 1987.
Myers, Brad A. et al., "Extending the Windows Desktop Interface With Connected Handheld Computers," WSS'00 Proceedings of the 4th Conference on USENIX Windows Systems Symposium, vol. 4, 10 pages, 2000.
Myers, Brad A. et al., "User Interfaces That Span Hand-Held and Fixed Devices," CHI'2001 Workshop on Distributed and Disappearing User Interfaces in Ubiquitous Computer, 4 pages, 2001.
National Institute of Standards and Technology, "Advanced Encryption Standard (AES)," Federal Information Processing Standards Publication 197, 52 pages, Nov. 26, 2001.
National Institute of Standards and Technology, "Secure Hash Standard," Federal Information Processing Standards Publication 180-2, 83 pages, Aug. 1, 2002.
Netscape Communications Corporation, "Netscape Mail Server Administrator's Guide," Version 2.0, 172 pages, 1996.
Netscape Communications Corporation, "Netscape Mail Server Installation Guide," Version 2.0 for Unix, 62 pages, 1996.
Netscape Communications Corporation, "Netscape Mail Server User's Guide," Version 2.0, 35 pages, 1996.
Netscape Communications Corporation, "Netscape News Server Administrator's Guide for Windows NT," Version 2.0, 119 pages, 1996.
Niederée, Claudia et al., "A Multi-Dimensional, Unified User Model for Cross-System Personalization," Proceedings of the AVI 2004 Workshop on Environments for Personalized Information Access, 11 pages, 2004.
Nokia, "Developer Platforms," 3 pages, 2005.
"NotesPump 1.0 Release Notes," Publication Unknown, 8 pages, Published prior to Jan. 8, 2003.
Opyt, Barbara et al., "Use the Internet as Your Lotus Notes WAN," Lotus Notes Advisor, pp. 17-20, Nov.-Dec. 1996.
Ortiz, C. Enrique, "An Introduction to the Symbian OS™ Platform for Palm OS® Developers," Metrowerks Corp., 21 pages, 2002.
"Overview—What Is Lotus NotesPump?," Publication Unknown, 88 pages, Published prior to Jan. 8, 2003.
Perez, Sarah, "Onavo's Data-Compressing Mobile App Raises $10 Million Series B From Horizons, Motorola Ventures," 2 pages, Jan. 24, 2012.
Phillips, Joshua et al., "Modeling the Intelligence Analysis Process for Intelligent User Agent Development," Research and Practice in Human Resource Management, vol. 9, No. 1, pp. 59-73, 2001.
Pyle, Hugh, "The Architecture of Lotus Notes," Lotus Notes Advisor, Premiere Issue, pp. 18-27, 1995.
Pyle, Lisa, "A Jump Start to the Top Ten R3-to-R4 Migration Considerations," The View, vol. 1, Issue 5, 22 pages, Nov.-Dec. 1995.
Qualcomm Incorporated, "Managing Background Data Traffic in Mobile Devices," 16 pages, Jan. 2012.
Qualcomm, "System Parameter Recommendations to Optimize PS Data User Experience and UE Battery Life," 80-W1112-1, Revision B, 9 pages, Mar. 2007.
Ringel, Meredith et al., "iStuff: A Scalable Architecture for Lightweight, Wireless Devices for Ubicomp User Interfaces," Proceedings of UbiComp 2002, 2 pages, 2002.
Shafran, Andrew Bryce, "Easy Lotus Notes® for Windows™," Que Corporation, 199 pages, 1994.
Signorini, Eugene, "Seven's Service-Based Wireless Solutions Enable Enterprises to Untether E-Mail," Wireless/Mobile Enterprise & Commerce, 16 pages, Oct. 2004.
Swedeen, Bret et al., "Under the Microscope—Domino Replication," LDD Today, 8 pages, Oct. 1, 1998.
Tamura, Randall A., "Lotus® Notes™ 4 Unleashed," Sams Publishing, 928 pages, 1996.
U.S. Appl. No. 60/663,463, File History, 113 pages, Mar. 18, 2005.
Vivacqua, Adriana et al., "Profiling and Matchmaking Strategies in Support of Opportunistic Collaboration," CoopIS/DOA/ODBASE 2003, LNCS 2888, pp. 162-177, 2003.
Wainwright, Andrew, "Secrets to Running Lotus Notes: The Decisions No One Tells You How to Make," IBM Corporation, 193 pages, Oct. 1996.
Wilcox, Adam A., "PC Learning Labs Teaches Lotus Notes 3.0," Ziff-Davis Press, 381 pages, 1993.
Wong, Harry, "Casahl's Replic-Action: Delivering True Notes—DBMS Integration," The View, vol. 2, Issue 1, pp. 33-50, Jan.-Feb. 1996.
European Patent Application No. EP 05813041.0, Supplementary European Search Report & Examination Report, 10 pages, Apr. 25, 2013.
European Patent Application No. EP 05813045.1, Supplementary European Search Report & Examination Report, 6 pages, Apr. 9, 2013.

* cited by examiner

SECURE END-TO-END TRANSPORT THROUGH INTERMEDIARY NODES

CROSS-REFERENCE TO RELATED APPLICATION(S)

This application is a continuation of U.S. patent application Ser. No. 12/889,252, filed Sep. 23, 2010, entitled SECURE END-TO-END TRANSPORT THROUGH INTERMEDIARY NODES," which application is a continuation of U.S. patent application Ser. No. 12/875,785 filed Oct. 19, 2007, titled "SECURE TRANSPORT FOR MOBILE COMMUNICATION NETWORK" now U.S. Pat. No. 7,827,597 which issued Nov. 2, 2010, which is a continuation of U.S. patent application Ser. No. 10/339,369 filed Jan. 8, 2003, titled "SECURE TRANSPORT FOR MOBILE COMMUNICATION NETWORK" now U.S. Pat. No. 7,305,700 which issued Dec. 4, 2007, which claims benefit of U.S. Provisional Application No. 60/346,881 filed Jan. 8, 2002, titled "MOBILE DATA SERVICES" and claims benefit of U.S. Provisional Application No. 60/403,249 filed Aug. 12, 2002, titled "MOBILE DATA SERVICES." The disclosure of each of the aforementioned applications is incorporated herein by reference in their entireties.

BACKGROUND

Security is a concern when information is transferred over the Internet. Encryption technology may be used to protect data transferred between two nodes communicating across a network such as the Internet. The Internet infrastructure involved in transferring a particular set of data may include one or more intermediary network processing nodes that need to process different portions of the data in order to correctly route the packets between the two endpoints.

The intermediary network processing nodes may be given access to the encryption key used to encrypt the data. However, decrypting the packets at the intermediary points presents a security risk. For example, an eavesdropper may be able to access the data after being decrypted at the intermediary network processing nodes.

The present invention addresses this and other problems associated with the prior art.

SUMMARY

A communication node encrypts a first portion of a transaction associated with point-to-point communications using a point-to-point encryption key corresponding to a first security association. A second portion of the transaction associated with end-to-end communications is encrypted using an end-to-end encryption key corresponding to a second security association.

The foregoing and other objects, features and advantages of the invention will become more readily apparent from the following detailed description of a preferred embodiment of the invention which proceeds with reference to the accompanying drawings.

DETAILED DESCRIPTION

The transfer of different types of data may be referred to below generally as a transaction. These transactions can be used for transferring email data, calendars, contacts, tasks, notes, electronic documents, files or any other type of control or content data.

Figure 1:
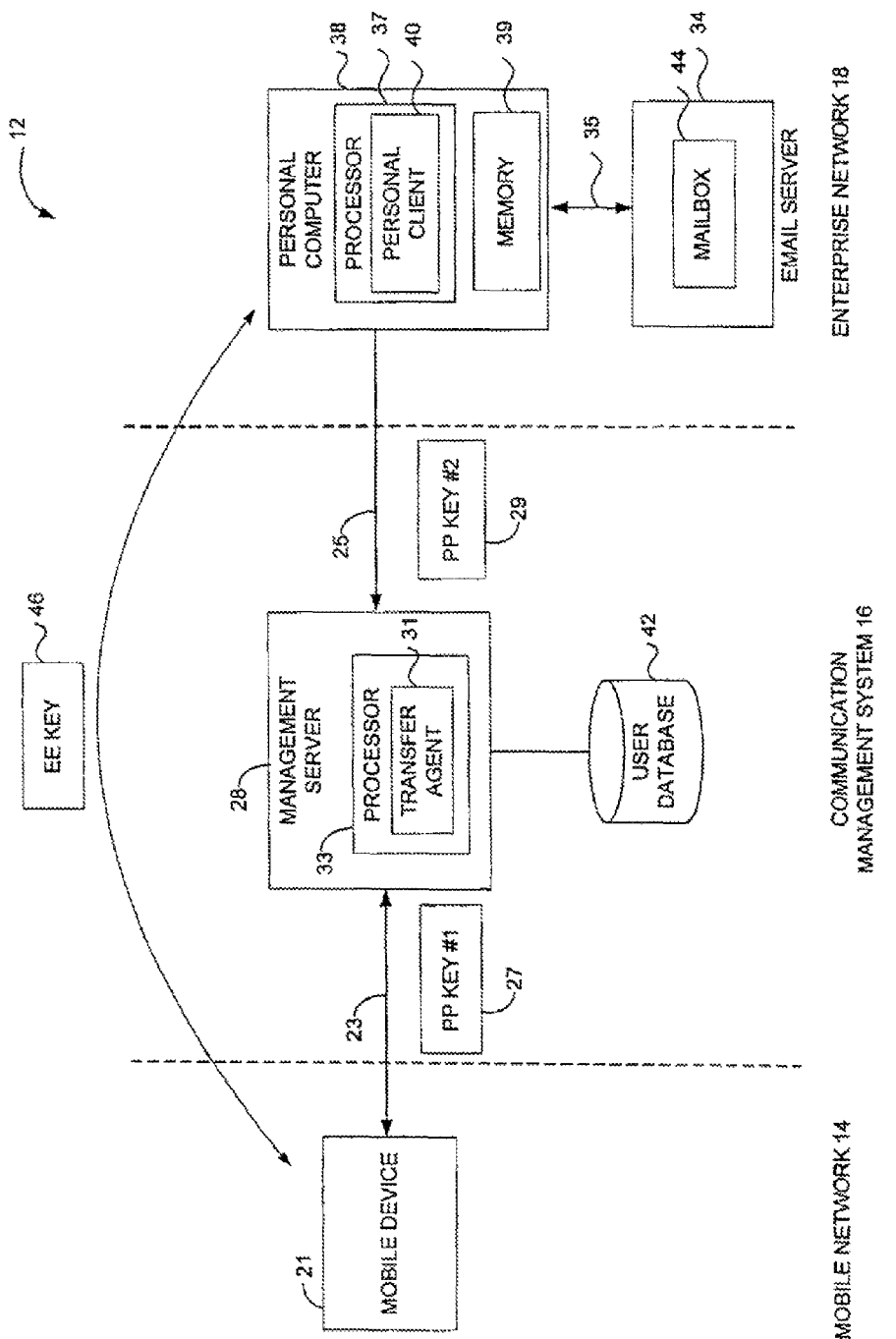
FIG. 1 is a block diagram showing how encryption keys are exchanged in a communication network.

FIG. 1 shows one embodiment of a communication network 12 that includes a mobile network 14, an enterprise network 18, and a communication management system 16 that manages communications between the mobile network 14 and the enterprise network 14. The mobile network 14 includes mobile devices 21 that communicate with an IP infrastructure through a wireless or landline service provider. Since mobile networks 14 are well known, they are not described in further detail.

The enterprise network 18 can be any business network, individual user network, or local computer system that maintains local email or other data for one or more users. In the embodiment shown in FIG. 1, the enterprise network 18 includes an email server 34 that contains a user mailbox 44 accessible using a Personal Computer (PC) 38. In one example, the email server 34 may be a Microsoft® Exchange® server and the PC 38 may access the mailbox 44 through a Microsoft® Outlook® software application. The mailbox 44 may contain emails, contact lists, calendars, tasks, notes, or any other type of data or electronic document.

The PC 38 is connected to the email server 34 over a Local Area Network (LAN) 35. The PC 38 includes memory 39 for storing local files that may include personal email data as well as any other types of electronic documents. Personal client software 40 is executed by a processor 37 in the PC 38. The personal client 40 enables access to email, calendars, and contact information as well as local files for mobile device 21.

The communication management system 16 includes at least one management server 28 that includes a processor 33. The processor operates a transfer agent 31 that manages the transactions between the mobile device 21 and the enterprise network 18. A user database 42 includes configuration information for different users of a mobile communication server. For example, the user database 42 may include login data for user of the mobile communication server. While referred to as a management system 16 and management server 28, this can be any intermediary system that includes one or more intermediary servers that operate between the mobile network 14 and the enterprise or private network 18.

The personal client 40 makes an outbound connection 25 to the management server 28. The personal client 40 registers the presence of a particular user to the management server 28 and negotiates a security association specifying a cryptographic ciphersuite (including encryption cipher, key length, and digital signature algorithm) and a unique, secret point-to-point encryption key 29 over connection 25. In one example, the key 29 is an Advanced Encryption Standard (AES) key, which is negotiated using the Diffie-Hellman cryptographic algorithm. Of course, encryption ciphers other than AES can also be used. The encryption key 29 enables secure communication between management server 28 and PC 38 over connection 25.

The mobile device 21 negotiates a point-to-point security association, specifying a cryptographic ciphersuite and a unique encryption key 27, with the management server 28. In one example, the point-to-point encryption key 27 is an AES encryption key. The negotiated security association that includes encryption key 27 enables secure point-to-point communication between the mobile device 21 and the management server 28 over connection 23. Each different mobile device 21 must negotiate a different security association that includes a unique encryption key 27 with the management server 28.

The point-to-point encryption key 27 may be used for encrypting control data that needs to be transferred between the mobile device 21 and management server 28. The point-to-point encryption key 29 may be used for encrypting control data that needs to be transferred between the management server 28 and personal client 40. For example, the control data may include login information and transaction routing information.

An end-to-end security association, specifying a cryptographic ciphersuite and a unique encryption key 46, is negotiated between the mobile device 21 and the personal client 40. In one example, the end-to-end encryption key 46 is an AES encryption key. The end-to-end encryption key 46 is used for encrypting transaction payloads transferred between personal client 40 and mobile device 21. For example, the end-to-end encryption key 46 may be used for encrypting the content of emails, files, file path names, contacts, notes, calendars, electronic documents and any other type of data that needs to be securely transferred between mobile device and the PC. The end-to-end encryption key 46 is only known by the mobile device 21 and the personal client 40. Data encrypted using the end-to-end key 46 cannot be decrypted by the management server 28.

Figure 2:
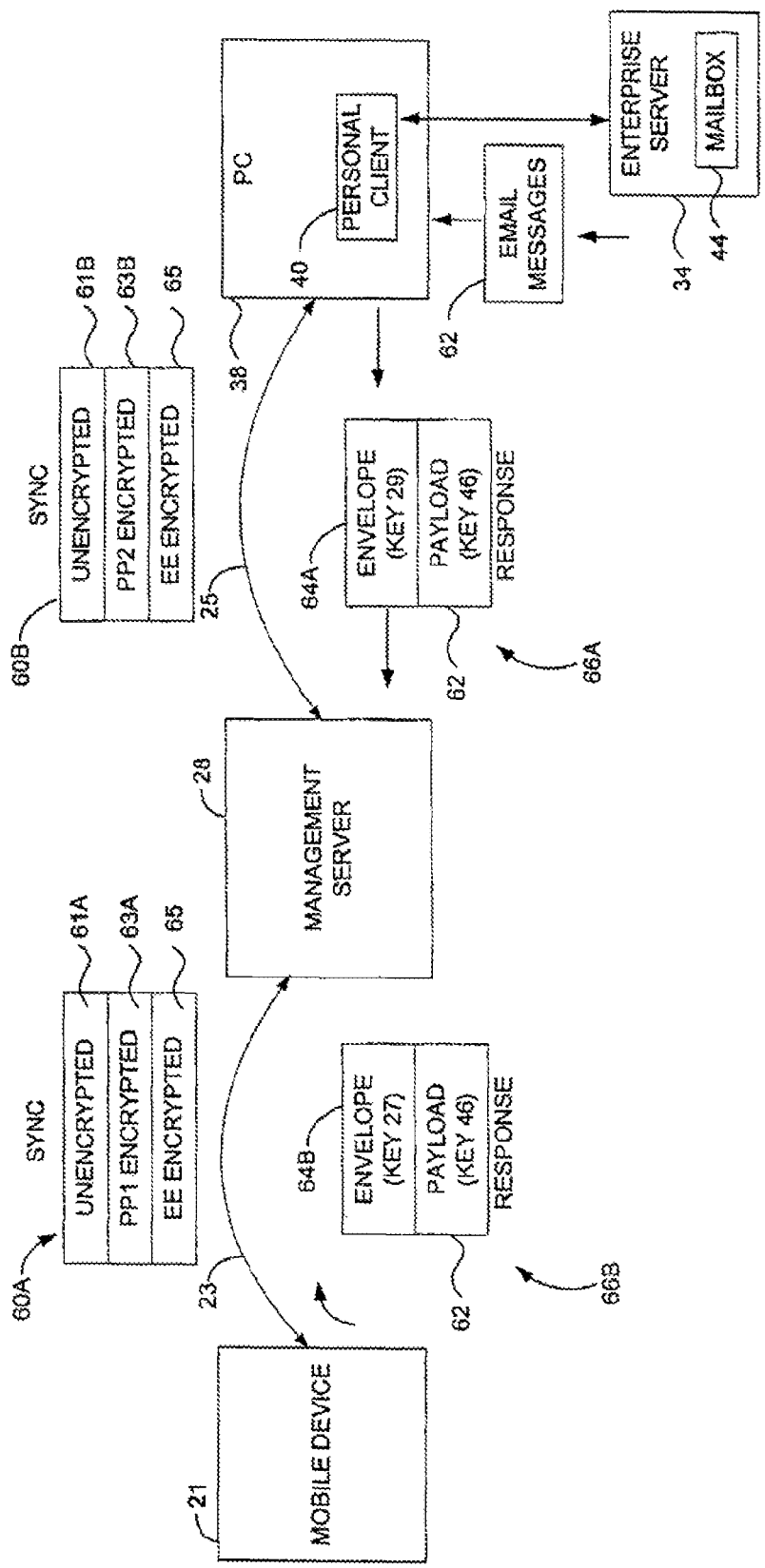
FIG. 2 is a block diagram showing how data is encrypted according to the encryption keys.

FIG. 2 shows an example of a synchronization transaction 60A sent by the mobile device 21 requesting retrieval of the latest email messages in mailbox 44. One portion 63A of the synchronization transaction 60A is encrypted by the mobile device 21 using the point-to-point encryption key 27 (FIG. 1). Another portion 65 of synchronization transaction 60A is encrypted using the end-to-end encryption key 46. Another third portion 61A of the synchronization transaction 60 may not be encrypted at all. The mobile device 21 sends the synchronization transaction 60A to the management server 28 over connection 23.

The management server 28 decrypts the portion 63A of the transaction 60 encrypted using the point-to-point encryption key 27. Since server 28 does not have encryption key 46, portion 65 is not decrypted. The management server 28 decodes any unencrypted data 61A and the decrypted point-to-point data 63A to determine how to process the synchronization transaction 60A. Part of the processing may include re-encrypting some or all of the decrypted data 63A back into point-to-point encrypted data 63B using encryption key 29. The management server 28 may also modify or add to the unencrypted data 61A to generate new unencrypted data 61B. The unencrypted data 61B and the re-encrypted point-to-point data 63B are combined with the end-to-end encrypted data 65 to generate new synchronization transaction 60B. The transaction 60B is transported to personal client 40 over the connection 25.

The personal client 40 decrypts the point-to-point encrypted data 63B using the encryption key 29 and decrypts the end-to-end encrypted data 65 using the encryption key 46. The personal client 40 obtains email messages 62 from the mailbox 44 pursuant to the decrypted instructions in synchronization transaction 60B. The personal client 40 encrypts the content of the email messages 62 using the end-to-end encryption key 46.

The personal client 40 generates a response transaction 66A that may attach an envelope 64A to the end-to-end encrypted email messages 62. The envelope 64A may contain communication parameters identifying transaction 66A as a response to the synchronization transaction 60B and may contain other message parameters such as the size of the email messages 62.

Some or all of the envelope 64A may be encrypted using the point-to-point encryption key 29. The personal client 40 then sends message 66A to the management server 28. The management server 28 decrypts the envelope 64A using the point-to-point encryption key 29 and processes the decrypted data necessary for forwarding the response transaction 66A to the mobile device 21. The payload 62 in the response transaction 66A is not decrypted since the management server 28 does not have access to end-to-end key 46.

The management server 28 re-encrypts some or all of the information in envelope 64A into envelope 64B. The envelope 64B is re-encrypted using the point-to-point key 27. A response message 66B is generated that includes the envelope 64B and end-to-end encrypted payload 62.

The response message 66B is transported to mobile device 21 over connection 23. The mobile device 21 decrypts the envelope 64B using encryption key 27 and decrypts the payload 62 using the encryption key 46. The decrypted payload 62 is then displayed on the mobile device 21. For example, emails from the mailbox 44 are displayed on the mobile device 21.

Figure 3:
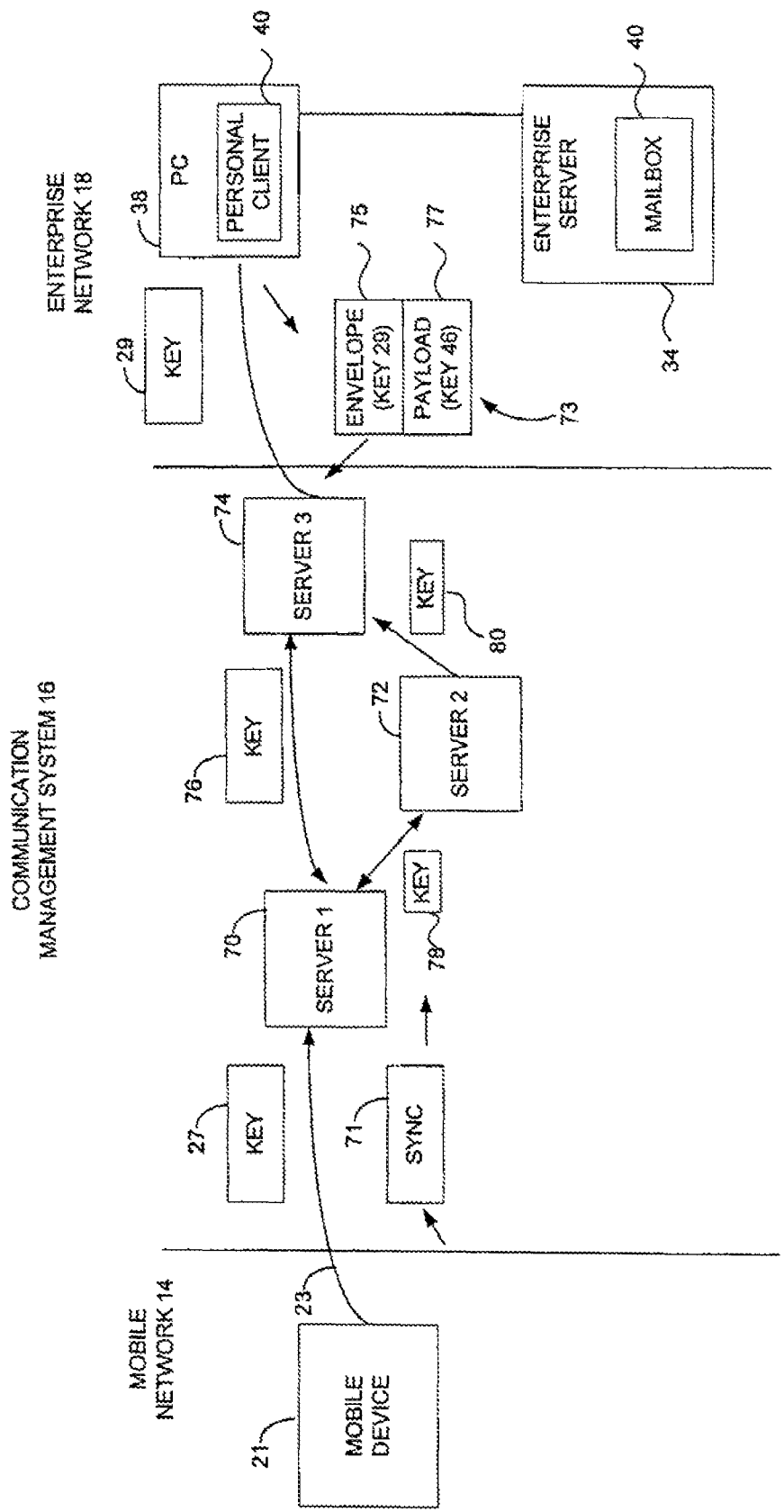
FIG. 3 is a block diagram showing how multiple encryption keys are exchanged between different servers in the communication network.

FIG. 3 shows another embodiment of the invention. The communication management system 16 may include multiple servers 70, 72 and 74 that each perform different communication management tasks. Transactions 71 and 73 sent between mobile device 21 and PC 38 may need to be processed by different combinations of servers 70, 72 and 74.

Encryption key 76 is negotiated between server 70 and server 74, encryption key 78 is negotiated between server 70 and server 72, and encryption key 80 is negotiated between server 72 and server 74. The negotiated encryption keys 76, 78 and 80 are used when processing the transactions 71 and 73.

For example, the transaction 73 may be sent from personal client 40 to server 74. The personal client 40 encrypts some or all of the envelope 75 in transaction 73 using the encryption key 29 and encrypts a payload 77 using encryption key 46. After receiving transaction 73, server 74 decrypts envelope 75 using encryption key 29.

Server 74 may then need to send the transaction 73 to server 70. Server 74 re-encrypts the decrypted envelope 75 using encryption key 76. Upon receiving message 73, server 70 decrypts envelope 75 using encryption key 76. After processing the contents, the server 70 re-encrypts the envelope 75 using the encryption key 27 previously negotiated with mobile device 21. The transaction 73 is then sent from server 70 to mobile device 21. Similar to FIG. 2, the servers 70, 72 and 74 never have access to the encrypted payload 77 in transaction 73.

A synchronization transaction 71 on the other hand may need to be processed by all three servers 70, 72 and 74. A portion of the synchronization transaction 71 is encrypted using encryption key 27 when transported from mobile device 21 to server 70. Encryption key 78 is used for encrypting a portion of transaction 71 when transported from server 70 to server 72. Encryption key 80 is used to encrypt a portion of synchronization transaction 71 when transported from server 72 to server 74. Encryption key 29 is then used when the transaction 71 is transported from server 74 to PC 38.

Algorithms exist that allow secure negotiation of encryption keys between two nodes that are communicating directly with each other or that are communicating through intermediary nodes. One example of an encryption algorithm that allows secure key negotiation regardless of network topology is Elliptic Curve Cryptography Diffie-Hellman (ECC-DH).

Figure 4:
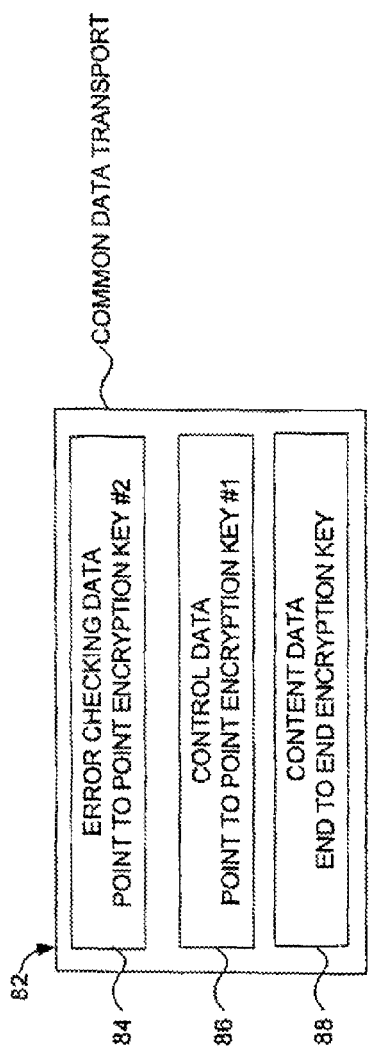
FIG. 4 is a diagram showing how different types of data are encrypted using different encryption keys.

FIG. 4 shows how encryption is performed differently for different types of data or for data associated with different destinations. Transaction 82 includes content data 88 such as the contents of an email message, an electronic document, or any other type of information that should only be accessed by two endpoints. The content data 88 is encrypted using an end-to-end encryption key.

A second portion 86 of transaction message 82 may include control information that only needs to be processed by one particular server. In this case, control data 86 is encrypted using a first point-to-point encryption key. A third portion of data 84 in transaction 82 may have other control information, for example, error checking data, that needs to be processed by a different server. Accordingly, the error checking data 84 is encrypted using a second point-to-point encryption key different than either of the other two encryption keys used for encrypting data 88 and 86.

Figure 5:
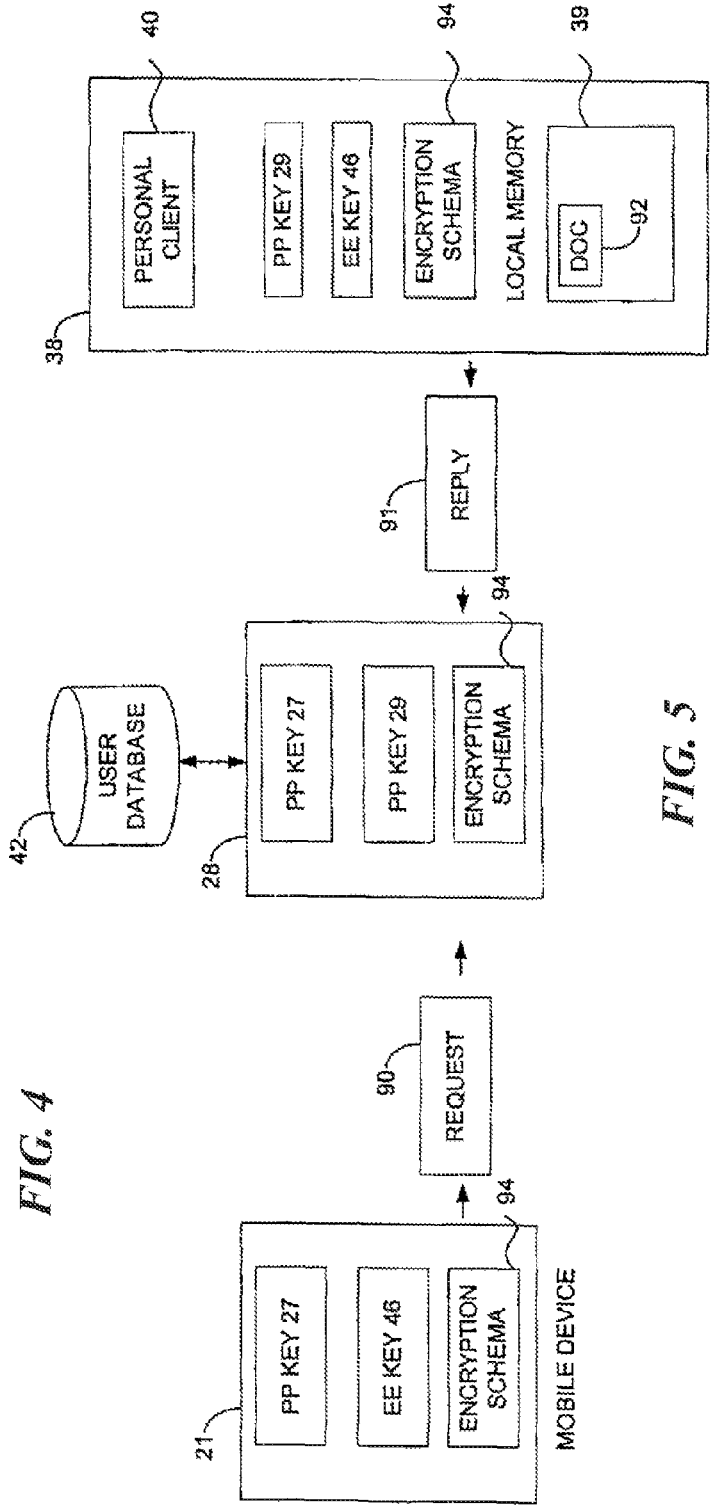
FIG. 5 is a diagram showing an encryption schema used for encrypting transactions.

FIG. 5 explains in more detail how an encryption scheme is used by the mobile device 21, management server 28, and personal client 40 when processing transactions between a source and a target device. In the example below, the mobile device 21 is operating as a source for sending a transaction 90. The transaction 90 requests personal client 40 to send a document 92 located in a personal directory in local memory 39 of PC 38. The personal client 40 operates as a target for the transaction 90 and the management server 28 operates as the transfer agent for transferring the transaction 90 from the mobile device 21 to the personal client 40.

It should be understood that this is only an example, and the devices shown in FIG. 5 can process many different types of transactions. For example, the transaction 90 may request synchronization of emails in the PC 38 with emails in the mobile device 21. Further, any device can operate as a source or target for the transaction. For example, the personal client 40 operates as a source and the mobile device 21 operates as a target when a transaction 91 is sent as a reply to request 90.

The mobile device 21, management server 28, and personal client 40 are all configured with an encryption schema 94 that identifies how specific items in the transaction 90 are to be encrypted. Each device is also configured with different security associations as described above in FIGS. 1-3. For example, the mobile device 21 has both Point-to-Point (PP) key 27 and End-to-End (EE) key 46. Management server 28 has PP key 27 and PP key 29, and the PC 38 has PP key 29 and EE key 46.

Figure 6:
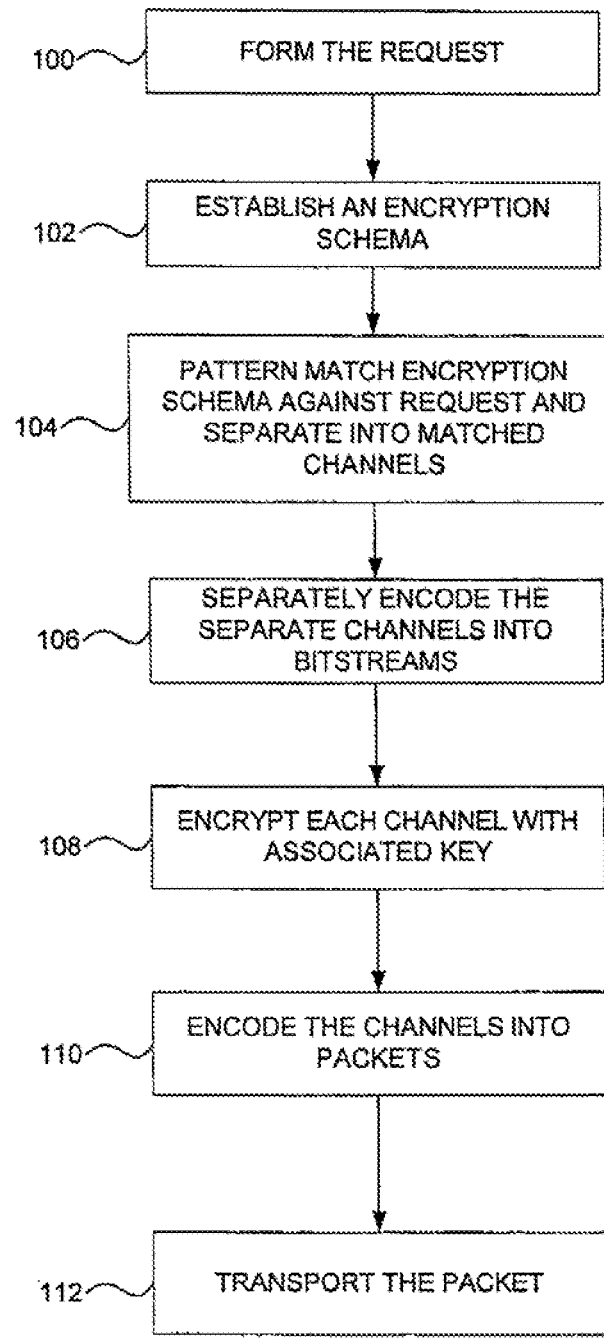
FIGS. 6-8 are block diagrams showing how different devices in the communication network use the encryption schema to encrypt and decrypt transactions.

Referring to FIGS. 5 and 6, the mobile device 21 in block 100 forms the request transaction 90. One example of a request is as follows:

```
Request:    {auth_token = "abc",
             device_id = "xyz",
```

```
             method_id = "GetDocument",
             args = {path = "/docs"}
             }
```

Mobile device 21 attaches an auth_token to transactions sent to the management server 28. For example, the mobile device 21 may be required to authenticate to the management server 28 by transmitting a username and password prior to being permitted to submit other transactions for processing. The server 28 issues the mobile device 21 an auth_token after successfully validating the username and password against information in the user database 42. The mobile device 21 then attaches the auth_token to subsequent transactions sent to the management server 28. The management server 28 uses the auth_token to identify and authenticate the source of each transaction and to determine where to route the transaction.

The device_id identifies the particular mobile device 21 sending the request 90. The device_id may be necessary for example when a user has more than one mobile device. The personal client 40 can use different device_id values to track when synchronization information was last sent to each of multiple different mobile devices. The device_id can also be used by either the management server 28 or the personal client 40 to determine how to format data sent to particular types of mobile devices 21. For example, data may need to be formatted differently for a cell phone as opposed to a personal computer. The device_id can also be used to correlate a known security association with a particular mobile device.

The method_id item in the example identifies a particular function GetDocument associated with request 90. The method_id item also requires the inclusion of related argument items that identify the parameters for the GetDocument function. For example, the argument items might include the expression path="/docs" identifying the pathname where the requested documents are located.

Block 102 in FIG. 6 establishes the encryption schema 94 previously shown in FIG. 5. One example of an encryption schema 94 is shown below illustrating how the example GetDocument request shown above would be handled in the specific case of communication between the mobile device 21 and the management server 28.

```
Encryption schema:    {GetDocument =
                       {clear = ["device id"],
                        pp = ["auth_token", "user_id"],
                        ee = ["args.path"]
                       }
                       default = { pp }
                      }
```

Any items that do not require encryption are assigned to the data channel labeled "clear". For example, the device_id item in the example is assigned to the channel "clear". Items requiring the use of point-to-point encryption are assigned to data channel "pp" and therefore are encrypted using the PP key 27 as shown in FIG. 5. In this example the auth_token is assigned to the "pp" channel and encrypted using the PP key 27. Items requiring end-to-end encryption are assigned to the "ee" channel and encrypted using the EE key 46 shown in FIG. 5. In this example the "args.path" item is assigned to the "ee" channel and encrypted using the EE key 46.

In this example, any item that is not explicitly declared in the encryption schema 94 is assigned by default to the "pp" channel. Since the method id item has not been specifically declared in the encryption schema 94, it is assigned to the "pp" channel by default and encrypted using the PP key 27.

It is important to note that the context of the communication determines the specific security association selected for encryption of a channel. For example, the first "pp" channel between mobile device 21 and management server 28 uses a security association different from the one established for the second, independently established "pp" channel between management server 28 and personal client 40. In this example, the first "pp" channel would employ the PP key 27 in FIG. 5 for transactions between device and server, while the second "pp" channel would use the PP key 29 for transactions between server and client. Because each security association is independently negotiated, the differences between the two aforementioned "pp" channels could extend beyond each channel having a unique key to include different key lengths (i.e. 256 bit vs. 128 bit), encryption ciphers (i.e. Triple DES vs. AES), digital signature algorithm (i.e. SHA1 vs. MD5), or other security parameters.

In order to prepare the request 90 for transmission, the mobile device 21 in block 104 of FIG. 6 performs a pattern match of the request 90 using the encryption schema 94. This pattern match separates the items in request 90 into different channels. One example of the different channels is shown below. In this example, the items in each channel are associated with predefined security associations: clear, pp, and ee.

```
Channels:   {clear = { device_id = "xyz"}
             pp = {auth_token = "abc", method id = "GetDocument"}
             ee = {args = {path = {path = "/docs"} } }
            }
```

In block 106, the channel contents are encoded (via a process commonly known as serialization) into arrays of bits or bytes referred to as data groups. These groupings of bits or bytes are referred to generally below as arrays but can be any type of partition, group, etc.

The contents of the clear channel are encoded into an array of bits referred to as data_group_1, the contents of the pp channel are encoded into an array of bits referred to as data_group_2, and the contents of the ee channel are encoded into an array of bits referred to as data_group_3. The contents of each channel need to be encoded into bit arrays so that they can be encrypted. The contents of the channels after being encoded into bit arrays are represented as follows.

```
Encoded
Channels:   {clear = data_group_1
             pp = data_group_2
             ee = data_group_3}
```

The bit arrays are then encrypted in block 108 according, to, the security association parameters for each channel. According to the encryption schema 94, bits in the clear channel (data_group_1) are not encrypted. The bits in the pp channel data_group_2 are encrypted using the point-to-point security association between mobile device 21 and management server 28, using PP key 27, and are referred to after encryption as pp_data_group_2. The bits in the ee channel data_group_3 are encrypted using the end-to-end security association between mobile device 21 and personal client 40, using EE key 46, and are referred to after encryption as ee_data_group_3. The data groups are represented as follows after encryption:

```
Encoded
Channels:   {clear = data_group_1
             pp = pp_data_group_2
             ee = ee_data_group_3}
```

The bits making up the encrypted and unencrypted channels are then encoded into one or more packets in block 110. For clarity, the description below will refer to a single packet, however, the data from the channels may be contained in multiple packets. Some of the contents of the packet are shown below.

| Packet | |
|---|---|
| Header | length |
|  | version |
|  | flags |
| Payload | count = 3 |
|  | "clear" |
|  | data_group_1 |
|  | "pp" |
|  | pp_data_group_2 |
|  | "ee" |
|  | ee_data_group_3 |

Information in the packet header may include the packet length, a version number, and other flags. The packet payload includes a count identifying 3 pairs of items. The three items include the non-encrypted contents in the clear channel, the pp encrypted contents of the pp channel, and the ee encrypted contents of the ee channel. The packet is then transported by mobile device 21 in block 112 to the management server 28.

Figure 7:
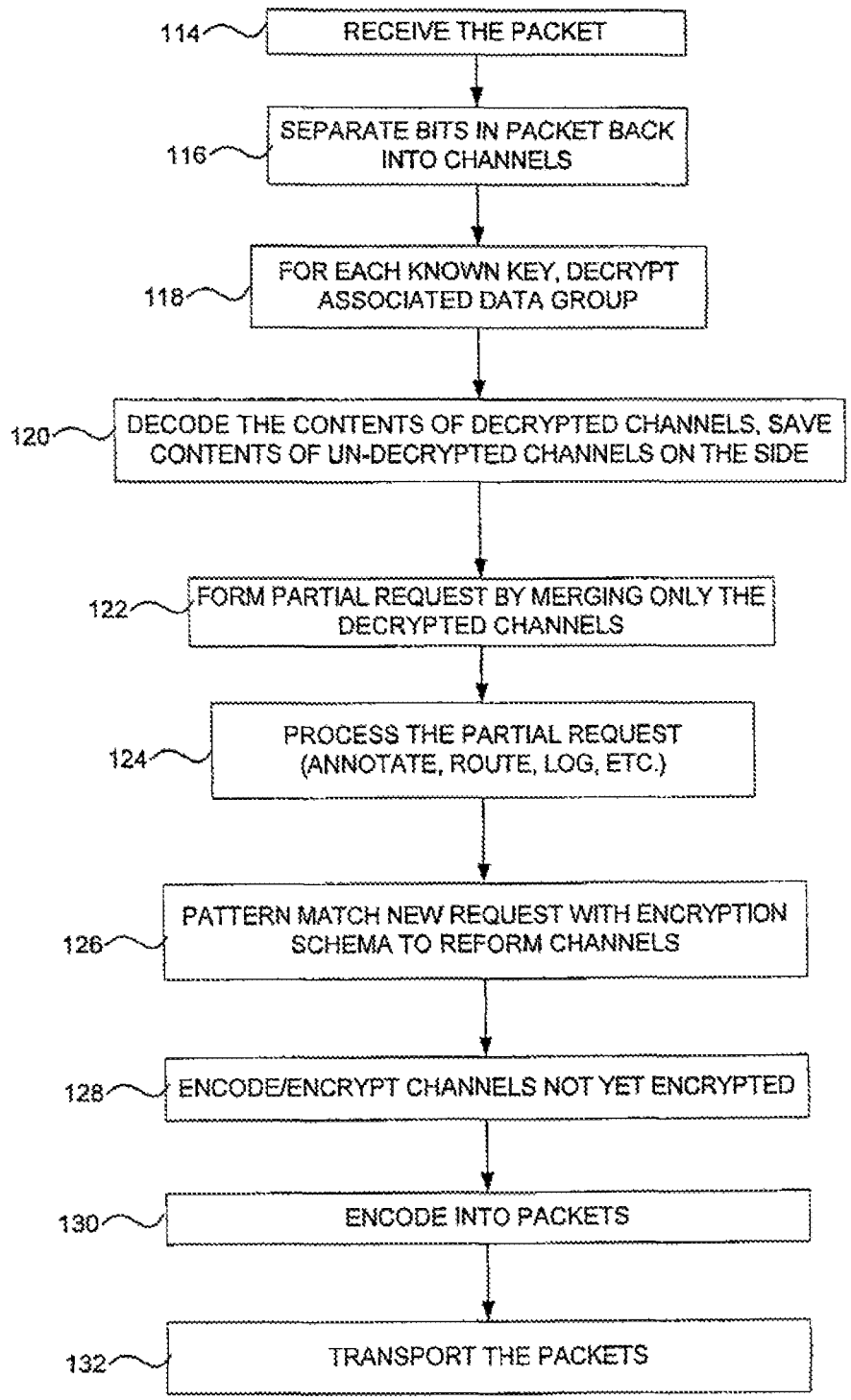

Referring to FIGS. 5 and 7, the transfer agent operating in server 28 receives the packet in block 114. The bits in the packet are separated in block 116 back into the different channels clear=data_group_1, pp=pp_data_group_2, and ee=ee_data_group_3.

The data in the clear channel does not need to be decrypted. The transfer agent in block 118 decrypts the only bits in channels for which it has a known security association. The transfer agent, as a member of the point-to-point security association between mobile device 21 and management server 28, possesses the PP key 27 and therefore decrypts the contents of the pp channel. The transfer agent is not a member of the end-to-end security association between mobile device 21 and personal client 40, does not have the EE key 46 and therefore does not decrypt the data in the ee channel. Decryption produces the following data groups: clear'=data_group_1, pp=data_group_2, and ee=ee_data_group_3.

The transfer agent in block 120 decodes the contents of the clear and pp channels. The contents of the encrypted ee channel are not decoded, but instead are maintained in an unmodified state for eventual transport to the personal client 40. Decoding produces the following contents.

```
Decoded
Channels:   {clear = {device id = "xyz"}
             pp = {auth token = "abc", method id = "GetDocument"}
             ee=ee_data_group_3
            }
```

In block 122 a partial request is formed by merging the items of the clear and pp channels. The partial request in this example could look similar to the following:

| | |
|---|---|
| Partial Request: | {auth_token = "abc", device_id = "xyz", method_id = "GetDocument", args = { } encrypted = {ee=ee_data_group_3} } |

The transfer agent in block 124 processes the partial request. In this example, the transfer agent may verify the request is authorized by matching the value of auth token ("abc") with contents in the user database 42 (FIG. 5). The auth_token and the method_id ("GetDocument") indicate that the transaction 90 is a document request directed to the personal client 40.

The transfer agent may identify a user id="joe" associated with the auth_token="abc" and generate the following new request.

| | |
|---|---|
| New Request: | {user_id = "joe", device_id = "xyz", method_id = "GetDocument", args = { } encrypted = {ee=ee_data_group_3} } |

In block 126 the transfer agent performs another pattern match of the new request with the encryption schema 94 to reform the channel contents associated with the different security associations. In this example, the items in the clear, pp, and ee channels are fairly similar to the items originally sent by the mobile device 21. The reformed channel contents are shown below.

| | |
|---|---|
| Channels Reformed by Transfer Agent: | {clear = device_id = "xyz"} pp = {user_id = "joe", method_id = "GetDocument"} ee = ee_data_group_3 } |

The transfer agent in block 128 encodes the contents of the clear channel into a bit array (clear=data_group_1). Since the encryption schema 28 defines no encryption for the clear channel, the bit array data_group_1 is not encrypted. The contents of the pp channel are encoded into a bit array pp=data_group_2 and then encrypted using the point-to-point security association between the management server 28 and the personal client 40, using PP key 29, forming the encrypted bit array pp=pp_data_group. The contents of the ee channel have never been decrypted or decoded by the transfer agent and therefore do not need to be re-encoded or encrypted. The following represents the bit arrays for reformed transaction.

| | |
|---|---|
| Encoded/encrypted Channels: | {clear = data_group_1 pp = pp_data_group_2 ee = ee_data_group_3} |

The transfer agent in block 130 encodes the channel contents into a packet format similar to that shown above. The packet is then transported to the personal agent 40 in block 132.

Figure 8:
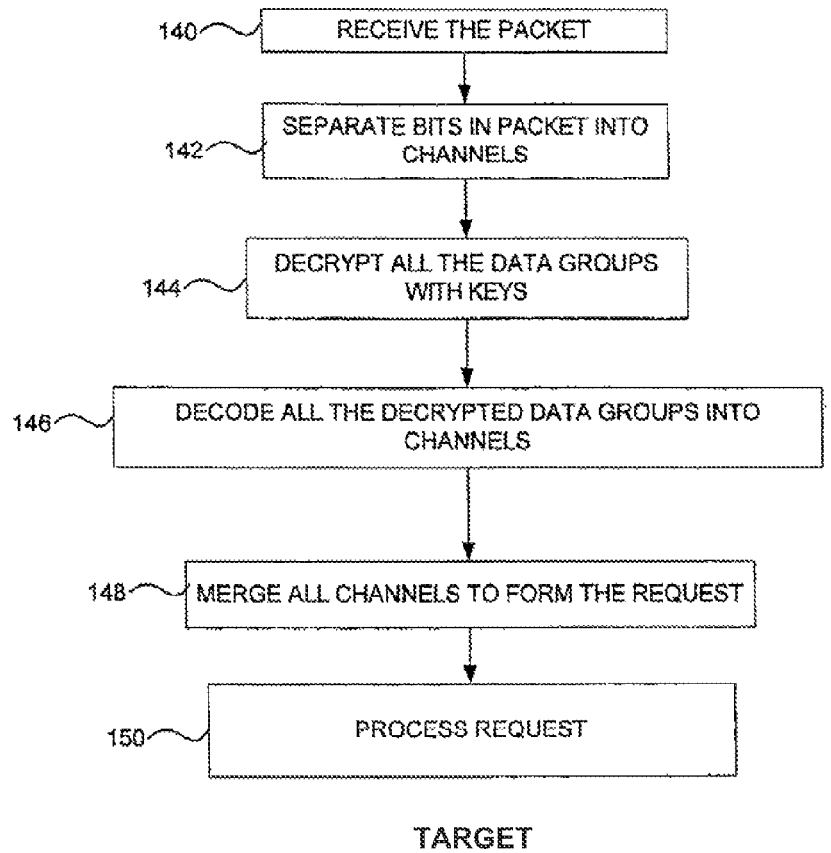

Referring to FIGS. 5 and 8, the personal client 40 is the target of the transaction 90. The personal client 40 receives the packet in block 140 and separates the bits in the packet back into channels in block 142.

| | |
|---|---|
| Encoded/encrypted Channels: | {clear = data_group_1 pp = pp_data_group_2 ee = ee_data_group_3} |

The personal client 40 has the PP key 29, the EE key 46, and knowledge of the relevant security associations. Therefore the contents of both the pp channel and the ee channel are decrypted in block 144 generating the following decrypted bit arrays.

| | |
|---|---|
| Decrypted Channels: | {clear = data_group_1 pp = data_group_2 ee = data_group_3} |

The contents of the channels are then decoded in block 146 generating the following request items.

| | |
|---|---|
| Decoded Channels: | {clear = { device_id = "xyz"} pp = {user_id = "joe", method_id = "GetDocument"} ee = {args = {path = "/docs"} } |

The contents of the channels are then merged together in block 148 forming the reformed request 90 with the auth_token replaced with the user_id.

| | |
|---|---|
| Request 90: | {device_id = "xyz", user_id = "joe", method_id = "GetDocument" args = {path = "/docs"} } |

The personal client 40 processes the request 90 in block 150. Pursuant to the request 90, the personal client 40 retrieves the identified documents and then creates a reply transaction 91 (FIG. 5) in a manner similar to mobile device 21 formed request 90. For example, the retrieved documents are encrypted using the end-to-end security association between the personal client 40 and the mobile device 21, using EE key 46. Some or all of the control information in the reply 91 is encrypted using the point-to-point security association between the personal client 40 and the management server 28, which includes PP key 29. The reply 91 may look similar to the following.

| | |
|---|---|
| Request 91: | {method_id = "GetDocumentResponse", args = {document = xxx, size = 5123, content_type = "text/plain", name = "readme.txt"} } |

According to the encryption schema, the method id may be encrypted using the PP key 29 and the remainder of the contents in reply 91 may be encrypted using the EE key 46.

Data Streaming

Figure 9:
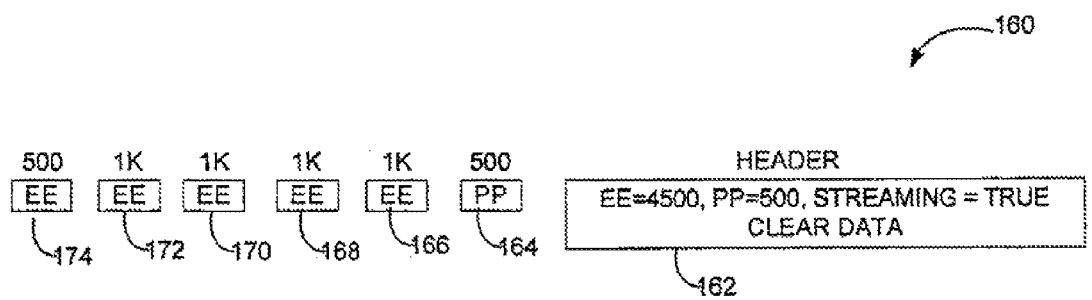
FIG. 9 shows how a large transaction is encoded into multiple packets.

Referring to FIG. 9, multiple packets 162-174 are used for transporting different portions of the same transaction 160. The multipacket transaction 160 may be used when one or more large documents are transferred between personal client 40 and the mobile device 21.

In one example, predetermined maximum packet length is configured to be 1000 bytes. If the transaction 160 is determined to be less than 1000 bytes, the contents of the clear, pp, and ee channels are encoded into a single packet. However, in this example, it is determined that 500 bytes of data exist in the pp channel and 4500 bytes of data exist in the ee channel. All the contents of the pp channel are encoded into a 500 byte packet 164. The data from the ee channel is encoded into four separate 1000 byte packets 166-174 and one 500 byte packet 174.

A header packet 162 is formed that identifies all the packets 162-174 as part of the same transaction 160. The data in the header packet 162 is unencrypted. Since the header packet 162 is unencrypted, it can also contain data from the clear channel. Alternatively, data from the clear channel can be encoded into a separate unencrypted packet. The header packet 162 identifies 500 bytes of data encrypted using the PP encryption key and 4,500 bytes of data encrypted using the EE encryption key.

The node receiving the message 160 reads the header 162 and determines the transaction 160 is a multipacket message (streaming=true). In one embodiment, the clear packet header 162 always comes first and is immediately followed by the pp packet 164. The pp packet 164 is immediately followed by .ee packets 166-174. This order can be guaranteed using protocols such as Transmission Control Protocol/Internet Protocol (TCP/IP). Transmitting the packets in this predetermined order eliminates having to attach labels to each packet to identify the type of encryption. Alternatively, sequence numbers can be assigned to the packets 162-174.

The node receiving transaction 160 may receive, decrypt and decode different portions of the transaction 160 at a time. For example, the processing node may first process the unencrypted clear data in the header packet 162 to determine if the transaction 160 is unauthorized. If the transaction is not authorized, the processing node can discard the remainder of the transaction 160 without having to decrypt and decode the pp packet 164 and ee packets 166-174.

If the information in the header packet 162 is authorized, the processing node decrypts and decodes data in the pp packet 164. If the data in the pp packet 164 is invalid or has been tampered with, the remaining ee packets 166-174 can be discarded without being further processed.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

We claim:

1. A method for independently encrypting channels of data in a transaction, the transaction comprising a transaction message, the method comprising:

encryption of a first data channel in the transaction message using a first security association; and encryption of a second data channel in the transaction message using a second security association.

2. A method according to claim 1 further comprising, encryption of an arbitrary number of additional data channels contained within the transaction message using a unique security association for each channel, wherein the first data channel consists of point-to-point control data and the second data channel consists of end-to-end content data.

3. A method according to claim 2 wherein the control data in the first data channel includes transaction authentication and routing information, and the end-to-end content data in the second data channel includes the contents of email messages, electronic files, or other electronic data.

4. A method according to claim 1 including:

negotiation of a first encryption key and security association for the first data channel between a mobile device and a server operating as a transfer agent for the transaction; and negotiation of a second encryption key and security association for the second data channel between a mobile device and a computer operating as an endpoint for the transaction; and negotiation of a third encryption key and security association for the first data channel between the server and an endpoint.

5. A method according to claim 4 including:

decryption of the first data channel at the server using the first encryption key; and re-encryption of the first data channel at the server using the third encryption key.

6. A method according to claim 5 including leaving the second data channel in the transaction at the server encrypted and unmodified.

7. A method according to claim 1 including leaving a third data channel in the transaction unencrypted.

8. A method according to claim 1 including:

assigning each item in the transaction to one of the data channels;

separating the different items in the transaction according to the assigned data channel;

encoding the separated items into data groups;

encrypting some or all of the data groups using the security associations assigned to the data channel corresponding to each data group; and encoding the processed data groups into one or more packets.

9. A method according to claim 7 including:

receiving the packets;

separating the contents of the packets according to the different data channels;

decrypting only the separated contents which correspond to known security associations;

decoding the decrypted contents into items; and processing the transaction according to the decoded items while the contents of data channels with unknown security associations remain encrypted and unmodified.

10. A method according to claim 1 including:
encoding a first set of packets containing only the data encrypted using the first security association;
encoding a second set of packets containing only the data encrypted using the second security association; and
encoding a packet header that contains unencrypted data, the packet header identifying a data size for the first set of packets and the second set of packets; and
transporting the first set of packets and then transporting the second set of packets immediately after the first set of packets.

11. A mobile device, comprising:
a processor configured to transmit or to receive a transaction message, the transaction message associated with a transaction, the transaction message having a first portion of data encrypted using a first security association and a second portion of data encrypted using a second security association.

12. A mobile device according to claim 11 wherein the processor is located either in a mobile device, a desktop computer, a server, or another computing node.

13. A mobile device according to claim 11 wherein the first portion of data comprises control information used for transporting the transaction over a network and the second portion of data comprises contents of a file, document, message, or document request.

14. A mobile device according to claim 11 wherein the processor is configured to send the transaction to an intermediary server for forwarding to an endpoint, the processor negotiating a point-to-point encryption key only with the intermediary server and negotiating a end-to-end encryption key only with the endpoint.

15. A mobile device according to claim 11 wherein the processor is configured to separate data items in the transaction into different channels, and is further configured to separately encode and encrypt the data channels according to the corresponding security associations.

16. A mobile device according to claim 11 wherein the processor is configured to encode the transaction into multiple packets, wherein each one of the packets contains data encrypted using the same encryption key.

17. A mobile device according to claim 11 wherein the processor is configured to generate a header that identifies a first set of the packets containing data encrypted using a first encryption key and a second set of the packets containing data encrypted using a second encryption key.

18. A system, comprising:
a server configured to:
receive a transaction message associated with a transaction, the transaction message containing a first portion of data encrypted using a first known encryption key and a second portion of data encrypted using a second unknown encryption key; and
decrypt the first portion of data to determine how to process the transaction while the second portion of data remains encrypted.

19. A system according to claim 11 wherein the transaction includes a third unencrypted portion of data, the server combining the decrypted first portion of data with the third unencrypted portion of data and processing the transaction according to the combined first and third portions of data.

20. A system according to claim 19 wherein the server is further configured to:
re-encrypt at least some of the decrypted first portion of data using a third encryption key; and
combine the re-encrypted first portion of data with the encrypted second portion of data to form a new transaction.

21. A system according to claim 20, further including multiple servers each configured to perform different operations on the transaction while being transported between two endpoints, the multiple servers configured to negotiate point-to-point encryption keys and to encrypt portions of the transaction using the negotiated encryption keys when the transaction is transported between the multiple servers.

22. A method for encrypting information, comprising:
associating different types of items in transaction messages associated with transactions with different security associations;
processing various different transactions at the network processing device;
correlating security associations with different channels in each of the transaction messages.

23. A method according to claim 22 including:
encrypting or decrypting the items in the transactions according to the corresponding security associations;
configuring the network processing device with different security associations containing encryption keys, the security associations correlated with at least some of the data channels;
decrypting only the items from the data channels having corresponding known security associations with configured encryption keys, while keeping the channels without known security associations encrypted; and
processing the transactions according to the decrypted items.

24. A method according to claim 23 including:
re-encrypting only the items in the processed transactions having corresponding security associations while preserving unmodified the data channels without known security associations; and
transporting the transactions containing re-encrypted and/or unmodified data channels to an endpoint.

25. A method according to claim 22 including:
separating items in the received transactions into channels associated with the different security associations;
encoding the items in each channel into bit arrays; and
encrypting or decrypting the bit arrays for each channel according to the associated encryption.

26. A method according to claim 22 including configuring the network processing device with an encryption schema that associates different types of items in the transactions with the different security associations, the network processing device encrypting or decrypting items in various received or transmitted transactions according to the configured encryption schema.

27. A method according to claim 26 including configuring the network processing device with the encryption schema by loading a list of the security associations into the network processing device, the list indexing the different items.

* * * * *